United States Patent [19]
Yagasaki et al.

[11] Patent Number: 5,428,396
[45] Date of Patent: Jun. 27, 1995

[54] VARIABLE LENGTH CODING/DECODING METHOD FOR MOTION VECTORS

[75] Inventors: Yoichi Yagasaki; Jun Yonemitsu, both of Kanagawa; Mark Veltman, Tokyo; Katsuji Igarashi, Tokyo; Motoki Kato, Tokyo, all of Japan

[73] Assignee: Sony Corporation, Tokyo, Japan

[21] Appl. No.: 173,042

[22] Filed: Dec. 27, 1993

Related U.S. Application Data

[63] Continuation-in-part of Ser. No. 918,010, Jul. 24, 1992, Pat. No. 5,298,991.

[30] Foreign Application Priority Data

Aug. 3, 1991 [JP] Japan .................. 3-194576

[51] Int. Cl.$^6$ ............................. H04N 7/137
[52] U.S. Cl. .......................... 348/416; 341/67; 341/106; 348/699; 375/245
[58] Field of Search ............. 348/413, 416, 699; 341/67, 106; 375/27; H04N 7/137

[56] References Cited

U.S. PATENT DOCUMENTS

| | | | |
|---|---|---|---|
| 4,995,059 | 2/1991 | Ishikawa | 375/27 |
| 5,006,929 | 4/1991 | Barbero | 348/420 |
| 5,111,294 | 5/1992 | Asai | 348/415 |
| 5,132,792 | 7/1992 | Yonemitsu | 348/416 |
| 5,298,991 | 3/1994 | Yagasaki | 348/416 |

Primary Examiner—Howard W. Britton
Attorney, Agent, or Firm—William S. Frommer; Alvin Sinderbrand

[57] ABSTRACT

In connection with compression-coding of video signals on the basis of inter-frame correlation, a single reference table is used for variable length encoding of inter-frame motion vectors established on the basis of various motion vector value ranges and degrees of accuracy. A reference table is provided for variable length encoding motion vectors based on a particular value range and degree of accuracy. In order to use the same table for motion vectors based on a larger value range than that for which the table was designed, the value of a motion vector to be encoded is divided to form a quotient and a remainder. An addition bit code is formed on the basis of the remainder and is appended to a variable length code which corresponds in the reference table to the quotient so that a variable length code value is formed for the motion vector based on the larger range. As to motion vectors based on a finer degree of accuracy than was provided for in the reference table, the motion vector value is multiplied by an appropriate factor and the resulting product is used to obtain a corresponding variable length code value from the reference table. Decoding is performed using the same table and by means of decoding operations that are the inverse of the encoding operations.

16 Claims, 14 Drawing Sheets

OBJECTIVE BLOCK

MOTION VECTOR

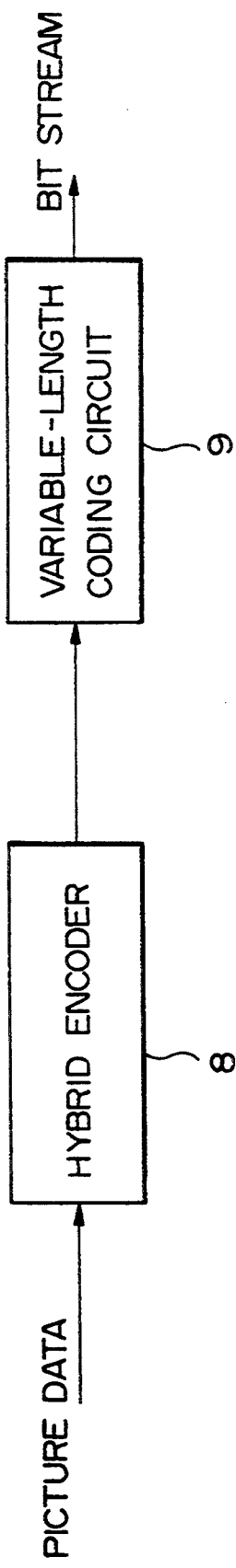

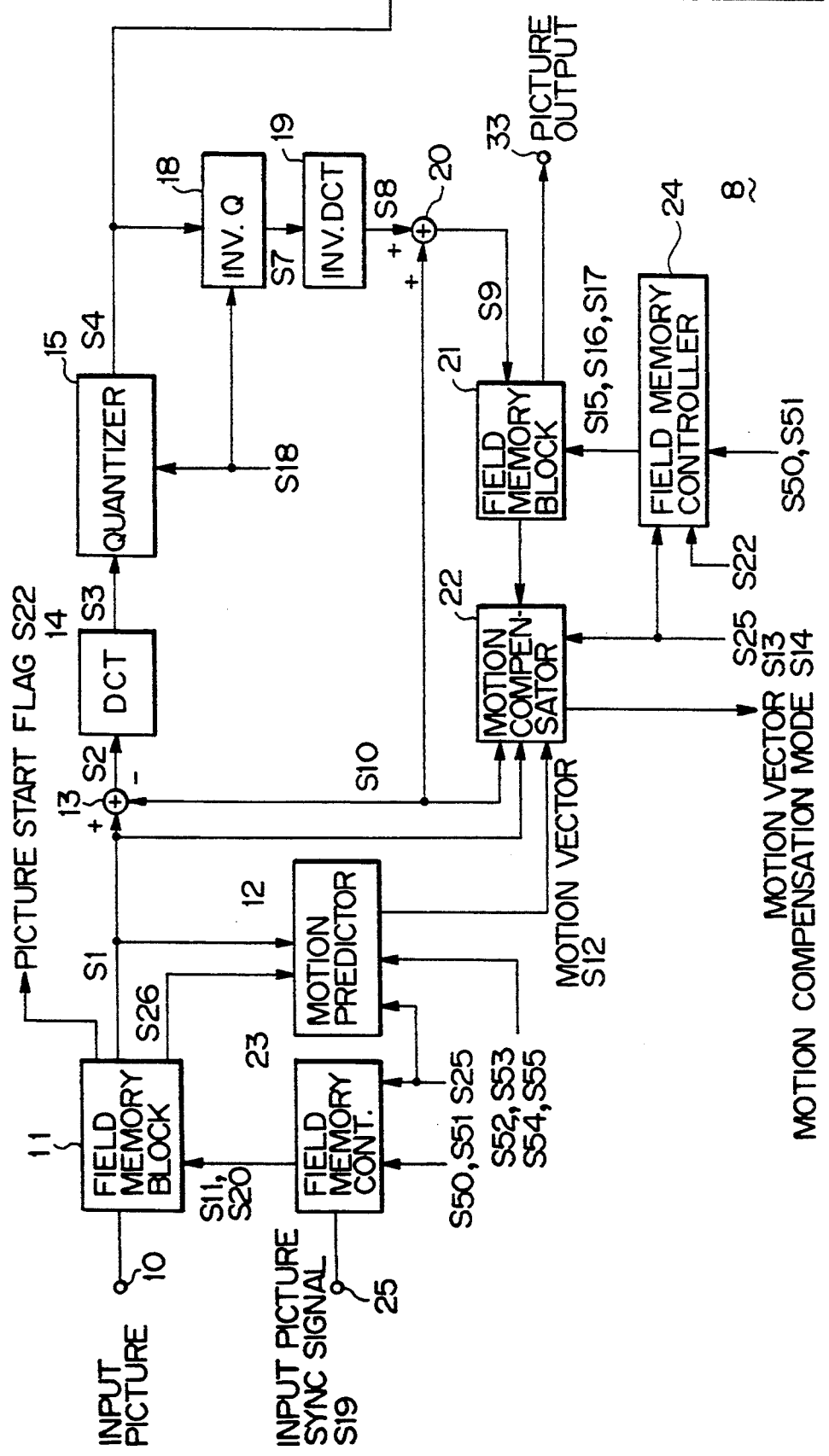

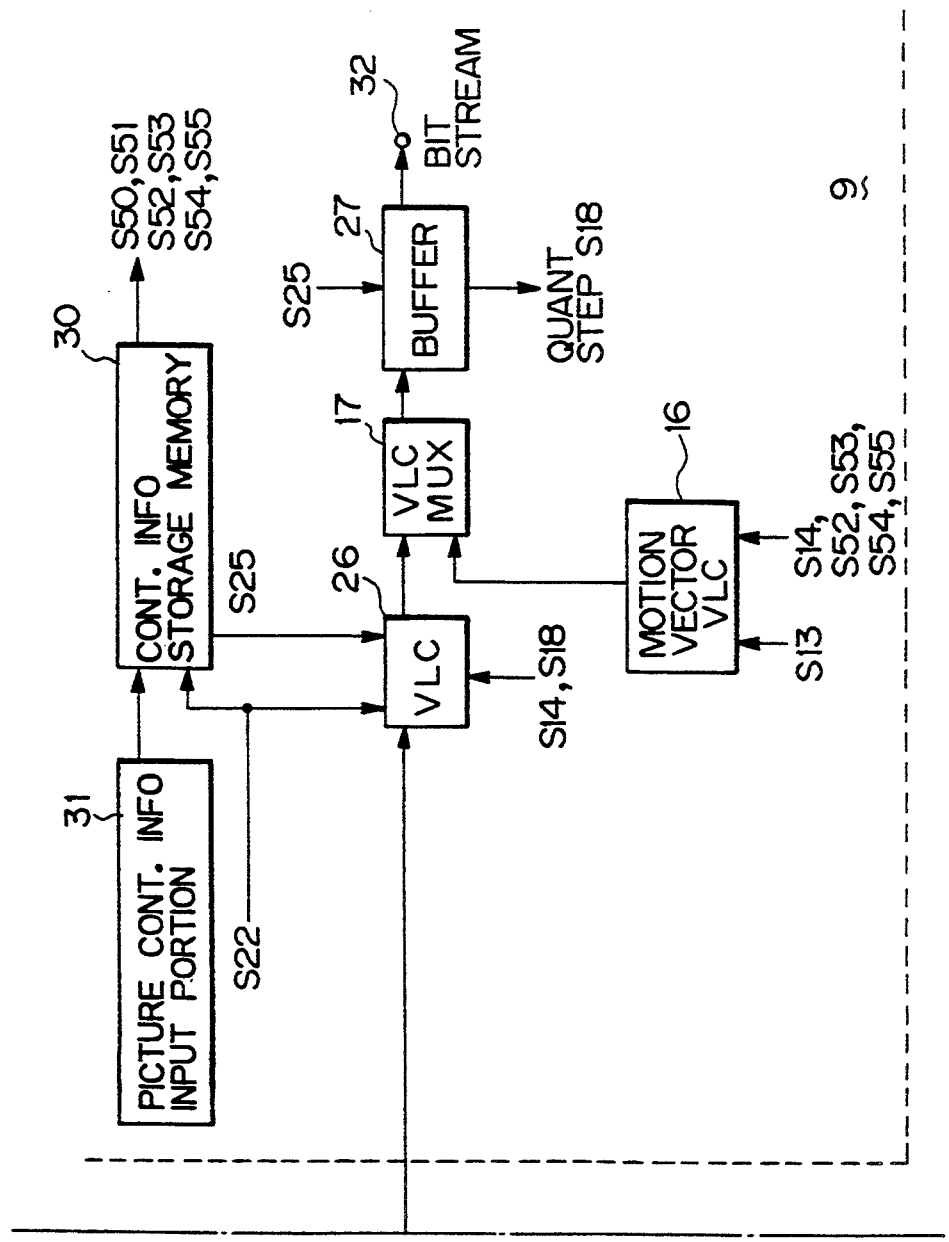

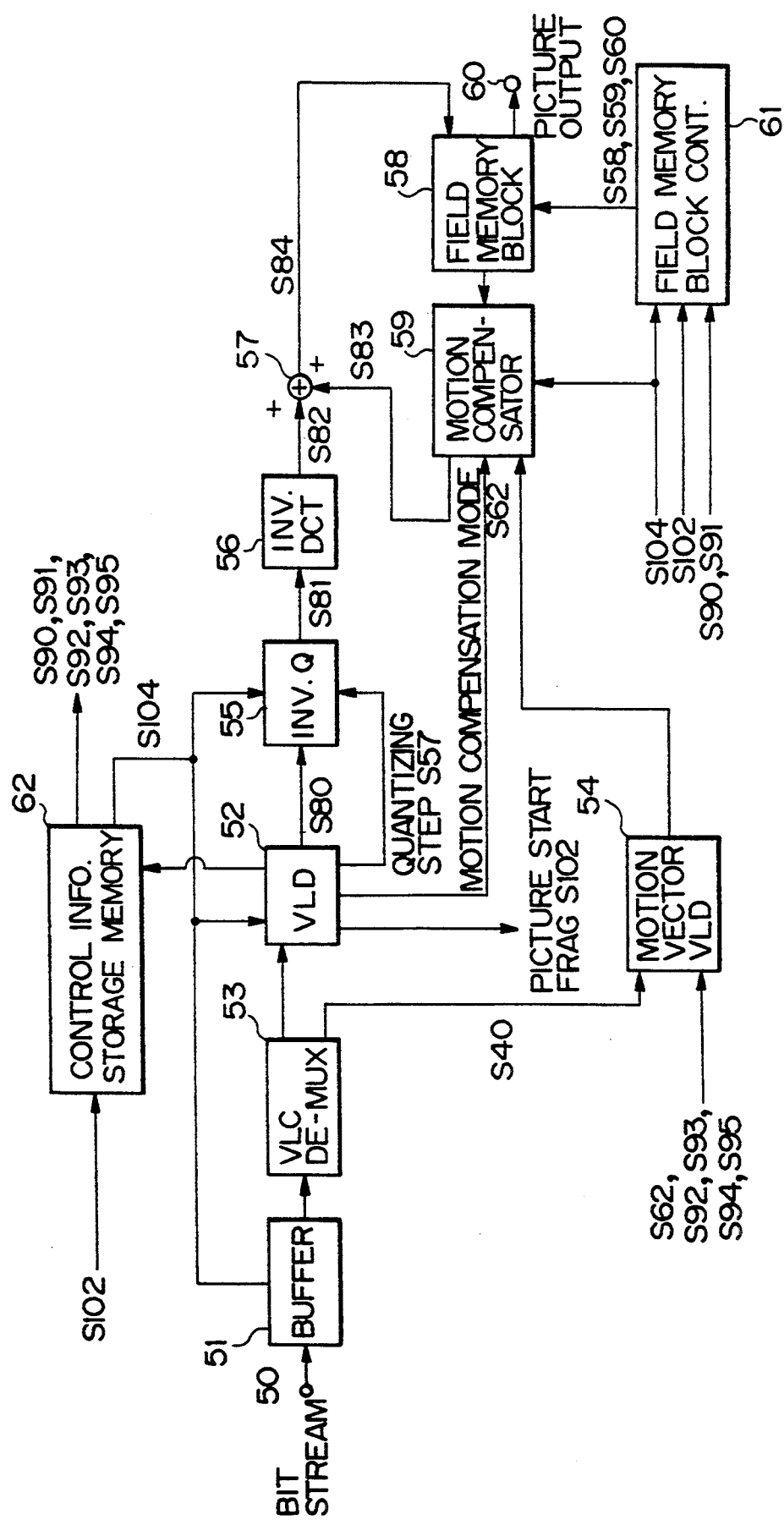

*Fig.6*

| 1 | 2 | 3 | 4 | 5 | 6 | 7 | 8 | 9 | 10 |
|---|---|---|---|---|---|---|---|---|---|
| 11 | 12 | 13 | 14 | | | | | | →|

VARIABLE LENGTH CODING/DECODING METHOD FOR MOTION VECTORS

This application is a continuation-in-part of U.S. patent application Ser. No. 07/918,010, filed on Jul. 24, 1992, now U.S. Pat. No. 5,293,991.

BACKGROUND OF THE INVENTION

1. Field of the Invention

The invention relates to a variable length coding and decoding method for motion vectors used in connection with a highly efficient technique for coding moving picture data utilizing inter-frame correlation, and more particularly is directed to variable length coding and decoding motion vectors formed with respect to a variety of motion vector ranges and degrees of accuracy.

2. Description of Related Art

When a moving picture signal is digitized for recording or transmission it is often necessary to compress the large amount of data that results from digitization, and for this purpose it is known to perform highly efficient coding of the digitized picture signal.

Recently the International Organization for Standardization has developed a video compression standard for use in video storage applications such as CD-ROM. This proposed standard is described in the document, "Coding of Moving Pictures and Associated Audio", ISO-ISC JTC1/SC2/WG11, MPEG 90/176 Rev. 2; Dec. 18, 1990.

Inter-frame predictive coding using correlation between frames is one known technique for highly efficient coding of a moving picture signal. In particular, inter-frame predictive coding with motion compensation is known, as in the MPEG document referred to above.

Motion compensated predictive coding uses correlation over time within the picture signal. A difference signal is formed for a present frame with respect to a past frame, after compensating for motion in the picture between the two frames.

This technique is described in U.S. Pat. No. 5,132,792, which has common inventors and a common assignee with the present application. The basic theory of motion compensated predictive coding, although well known to those skilled in the art, will now be summarized with reference to FIGS. 1A and 1B. In FIG. 1A, a screen display is shown in which a circular object is displayed. It will be noted that the screen display of FIG. 1A has been divided into blocks. FIG. 1B illustrates the next frame of the moving picture, in which the circular object has moved upwardly and to the right in the screen display.

The center block of FIG. 1A corresponds to the portion indicated by dotted lines in FIG. 1B. Thus the motion of the center block of FIG. 1A between the respective frames of FIGS. 1A and 1B is represented by a vector known as a "motion vector" and represented, in turn, by the arrow which appears in FIG. 1B.

In an apparatus for performing inter-frame predictive coding with motion compensation, a predictive reference picture is formed by locally decoding a picture for a previous frame and then moving the picture in accordance with a motion vector which represents motion between the previous frame and the frame which is presently to be coded. An inter-frame difference signal, between the present frame and the predictive reference picture is formed in order to provide a predictive error signal. The predictive error signal and the motion vector used to form the predictive reference picture are then output by the coding apparatus. At the decoding apparatus the present frame can be decoded on the basis of the picture data for the previous frame, the motion vector, and the predictive error signal. In this way, utilizing motion compensation, the total amount of data to be stored or transmitted can be reduced.

FIG. 1C illustrates an example of motion compensated predictive coding. In this example, each picture (a frame or a field) is divided into a large number of two dimensional blocks. For example, each block may be 16×16 picture elements. The motion compensated predictive coding is performed on a block by block basis. The motion vector is made up of X and Y components which respectively represent motion in the horizontal and vertical directions. According to a commonly used convention, motion in a rightward or downward direction is assigned a positive value and motion in a leftward or upward direction is assigned a negative value.

As shown in FIG. 1C, a sequence of moving pictures n+1, n+2 and n+3 follow a reference picture n and are respectively assigned motion vectors V1, V2 and V3.

When there is a strong correlation among the pictures and an object moves in a straight path at a substantially constant speed, the following relations apply:

$$V2 = 2 \times V1 \tag{1}$$

$$V3 = 3 \times V1 \tag{2}$$

These relations can be generalized as follows with respect to the magnitude of a motion vector for pictures having a strong correlation:

$$Vk = k \times V1 \tag{3}$$

FIG. 2 illustrates in graphical form the probability $\phi$ of occurrence of each value "a" of each element X or Y of a motion vector (X, Y). The probability function $\phi$ V1 (a) of the values for the motion vector V1 in relation to the probability function $\phi$ Vk (a) of the values of the motion vector Vk (obtained by multiplying V1 by k) is shown in FIG. 2 with $\phi$ Vk (a) being formed by horizontally multiplexing $\phi$ V1 (a) by k (because of expression (3)). (When these probability functions are totally integrated, the resulting value is one.) Thus, $\phi$ V1 (a) is obtained by dividing $\phi$ Vk (a) by k. Accordingly, when the (k times) motion vector Vk is divided by the distance between frames k, the same probability distribution is obtained as for the motion vector V1. In other words, the 1-frame-displacement motion vector V1, after multiplication by k, may be used as the k-frames-displaced motion vector Vk.

The values of the elements X and Y of the motion vector (X, Y) are each variable-length coded using Huffman code or the like prior to transmission. A variable length coding table is used to optimize the allocation of code length in accordance with the statistical distribution of the values of X and Y. For values of X and Y that occur frequently, a short coding length is assigned. On the other hand, for values having a low frequency of occurrence, a long coding length is assigned.

In U.S. Pat. No. 5,132,792, referred to above, optimization of a variable length code (VLC) table and a basic theory for sharing the table have been proposed.

The range and degree of accuracy for a motion vector can be arbitrarily assigned. For example, the range of a motion vector can be assigned as ±7 or ±15 picture elements with respect to the origin. In other words, the value of the motion vector can be selected from among $-7, -6, \ldots, 0, \ldots, +6, +7$, or $-15, -14, \ldots, 0, \ldots, +14, +15$ in the respective cases. The degree of accuracy for a motion vector can be assigned as, for example, one picture element or 0.5 picture element (half pel).

Consideration will next be given to motion vectors formed with respect to a plurality of ranges and degrees of accuracy.

According to prior art coding techniques, respective VLC tables were required for coding motion vectors formed with respect to a first range of, for example, ±7 picture elements and motion vectors formed with respect to a range of ±15 picture elements. For the ±7 picture element range, and where a degree of accuracy of one picture element is to be provided, the corresponding VLC table has 15 entries corresponding to $-7, -6, \ldots, 0, \ldots, +6, +7$. On the other hand, a second VLC table for the range of ±15 picture elements, with an accuracy of one picture element, has 31 entries corresponding to $-15, -14, \ldots, 0, \ldots, +14, +15$. Moreover, if it is also desired to form motion vectors over the ±7 picture element range but with a degree of accuracy of 0.5 picture elements, then the corresponding VLC table has 29 entries, corresponding to $-7.0, -6.5, -6.0, \ldots, 0, \ldots +6.0, +6.5, +7.0$.

According to prior art techniques, when there were several desired ranges and degrees of accuracy for motion vectors, the required number of VLC tables increased. This resulted in an increased need for memory storage capacity, which also increased the scale of the hardware.

A possible solution to this problem is to provide a VLC table for the largest desired range and finest desired degree of accuracy and then to share the same table for the respective motion vectors formed with respect to the various ranges and degrees of accuracy. For example, a VLC table for the ±15 picture element range may be provided and used for a motion vector formed with respect to a ±7 picture element range. However, in this case redundant codes are used so that the coding efficiency is reduced. This is because a VLC code which is optimized for coding efficiency over a range of ±15 picture elements is different from a VLC table optimized for coding over a range of ±7 picture elements.

OBJECTS AND SUMMARY OF THE INVENTION

Accordingly, it is an object of the present invention to provide a method of coding and decoding motion vectors formed over a plurality of ranges and with varying degrees of accuracy without increasing the scale of the hardware.

It is a further object to provide a variable length coding/decoding method for motion vectors with improved coding efficiency.

In accordance with an aspect of the present invention, there is provided a method of assigning a variable length code value to a motion vector, including the steps of providing a reference table for associating with a respective variable length code value each possible value of motion vectors formed on the basis of a first picture element range and a first degree of accuracy, receiving a value of an input motion vector which represents motion between two frames of a moving picture signal, and receiving information indicative of at least one of a picture element range and a degree of accuracy with respect to which the input motion vector was formed. The method further includes accessing the reference table with the value of the input motion vector if the picture element range and the degree of accuracy with respect to which the input motion vector was formed are the same as the first picture element range and the first degree of accuracy, but if at least one of the picture element range and the degree of accuracy with respect to which the input motion vector was formed is not the same, respectively, as the first picture element range and the first degree of accuracy, then the method includes performing a calculation on the value of the input motion vector according to a predetermined formula to generate an access value and accessing the reference table with the access value. The method further includes forming an output bit stream which includes a variable length code value obtained by accessing the reference table with the value of the input motion vector or the access value, as the case may be.

According to another aspect of the invention, there is provided a method of decoding a motion vector value that has been variable-length encoded, including the steps of providing a reference table for associating respective variable length code values with motion vector values formed on the basis of a first picture element range and a first degree of accuracy, receiving an input variable length code value representative of the value of an input motion vector, receiving flag information indicative of an input picture element range and an input degree of accuracy with respect to which the input motion vector was formed, the input picture element range being a selected one of a plurality of picture element ranges including the first picture element range, the input degree of accuracy being a selected one of a plurality of degrees of accuracy including the first degree of accuracy, the input motion vector representing motion between two frames of a moving picture signal, and the method also including the step of accessing the reference table on the basis of the received input variable length code and the received flag information.

The foregoing methods according to this invention are advantageous in that a single reference table can be used for coding and decoding motion vectors formed on the basis of a variety of ranges and a variety of degrees of accuracy. In effect, the single reference table is extended where necessary and/or values of the table are replaced, so that coding of the motion vectors can be performed with a high degree of efficiency, while the need for memory storage capacity is minimized, thereby preventing the scale of the hardware from being increased.

The above, and other objects, features and advantages of the present invention will be apparent from the following detailed description thereof which is to be read in connection with the accompanying drawings.

BRIEF DESCRIPTION OF THE DRAWINGS

FIG. 3 is a block diagram of an embodiment of a moving picture coding apparatus in accordance with the present invention;

FIGS. 4A and 4B are a more detailed block diagram of the apparatus of FIG. 3;

FIG. 5 is a block diagram of a moving picture decoding apparatus in accordance with the present invention;

FIG. 6 illustrates a sequence in which picture blocks are transmitted in a motion compensated predictive coding method according to the present invention;

DETAILED DESCRIPTION OF THE PREFERRED EMBODIMENTS

Figure 1A:
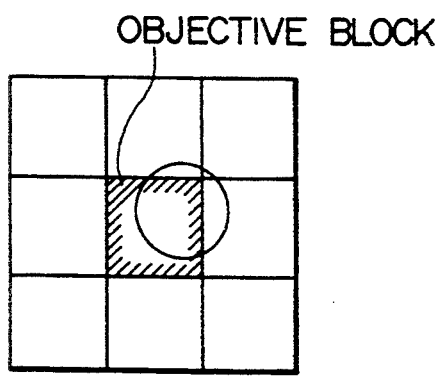
FIGS. 1A–1C comprise a schematic illustration of the theory of motion compensated predictive coding.
Figure 1B:
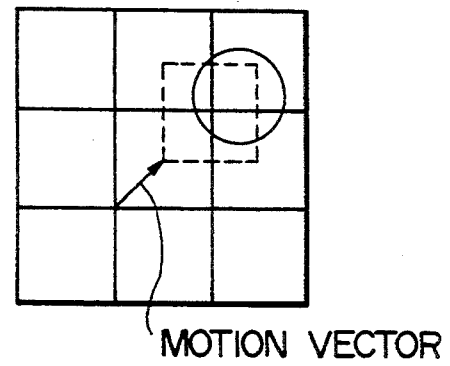
Figure 1C:
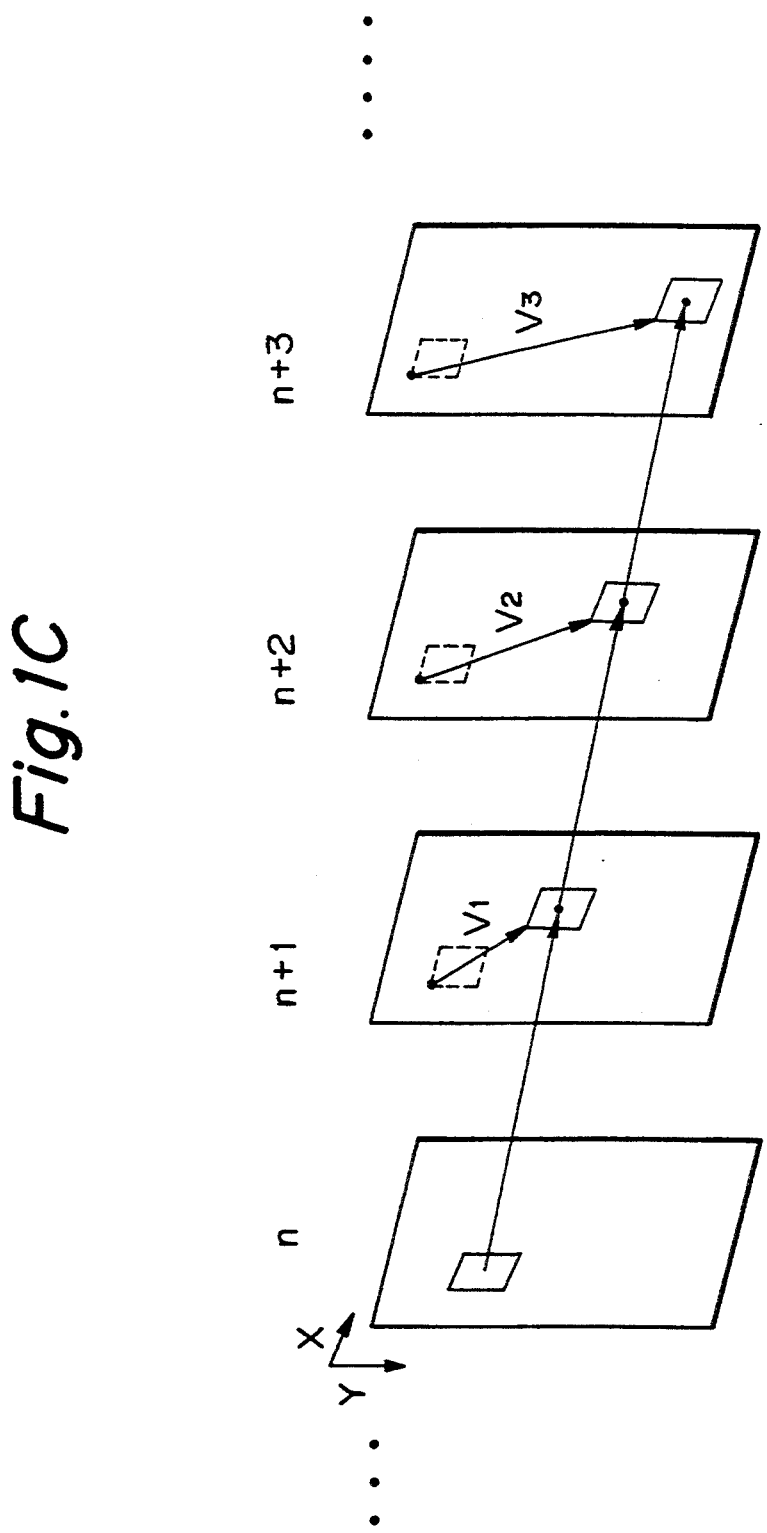
Figure 2:
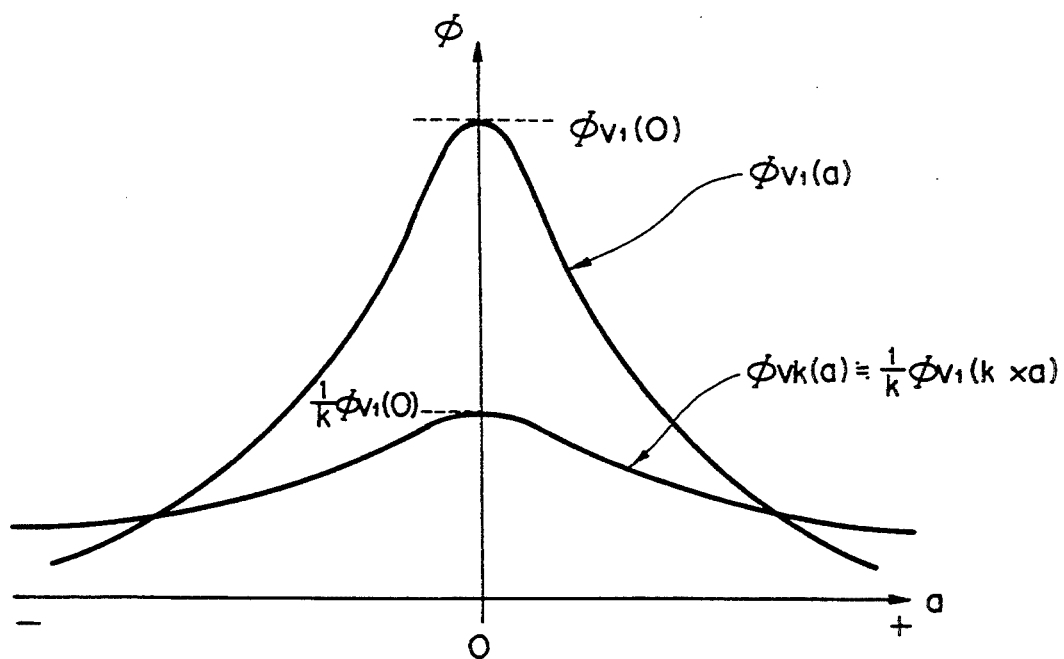
FIG. 2 is a graph of an example of the statistical distribution of motion vectors with respect to pictures having strong correlation.

There will now be described, with reference to FIGS. 3 and 4, an embodiment of a moving picture coding apparatus that variable length codes motion vectors according to the present invention.

FIG. 3 is a high-level block diagram of a moving picture coding apparatus according to the invention. The moving picture coding apparatus of FIG. 3 includes a hybrid encoder 8 and a variable length coding circuit 9. The hybrid encoder 8 performs both motion compensated prediction and transform coding using a 2-dimensional discrete cosine transform (DCT). The variable length coding circuit 9 forms a variable length bit stream on the basis of the output of the hybrid coding apparatus 8. Coding apparatus of this kind has been widely used in low bit rate coding of moving pictures in connection with video telephones and video teleconferencing.

FIGS. 4A and 4B respectively illustrate in more detail the hybrid encoder 8 and the variable-length coding circuit 9.

Data for controlling operation of the encoding apparatus is generated by a picture coding control data input portion 31 (FIG. 4B) and stored in a control information memory 30. A portion of the picture coding control data (such as signals indicative of picture frame size and coded data output bit rate) are output from the memory 30 as a signal S25.

The control information storage memory 30 also stores motion compensated predictive reference picture signals S50 and S51, motion vector range signals S52 and S53, and motion vector degree of accuracy signals S54 and S55. The signals S50, S52, and S54 represent control and reference signals for forward predictive coding. On the other hand, the signals S51, S53 and S55 represent control and reference signals for backward predictive coding. Each of the signal S50, S51, S52, S53, S54, and S55 can be changed from picture to picture (e.g., from frame to frame).

An input picture synchronizing signal S19 is received at an input terminal 25 (FIG. 4A). The synchronizing signal S19 is supplied to a field memory controller 23. When the field memory controller 23 receives the synchronizing signal S19, the controller 23 outputs a motion predictive reference picture signal S11 and a present coding picture signal S20 corresponding to the motion compensated predictive reference picture signals S50 and S51. The motion predictive reference picture signal S11, and the present coding picture signal S20 are supplied to a field memory block 11.

When a picture is read out from the field memory block 11, a picture start flag S22 goes high. The picture start flag S22 is supplied to a field memory controller 24. When the picture start flag S22 goes high, the field memory controller 24 outputs motion compensated reference picture signals S15 and S16 and an output picture signal S17 to a field memory block 21.

Figure 6:
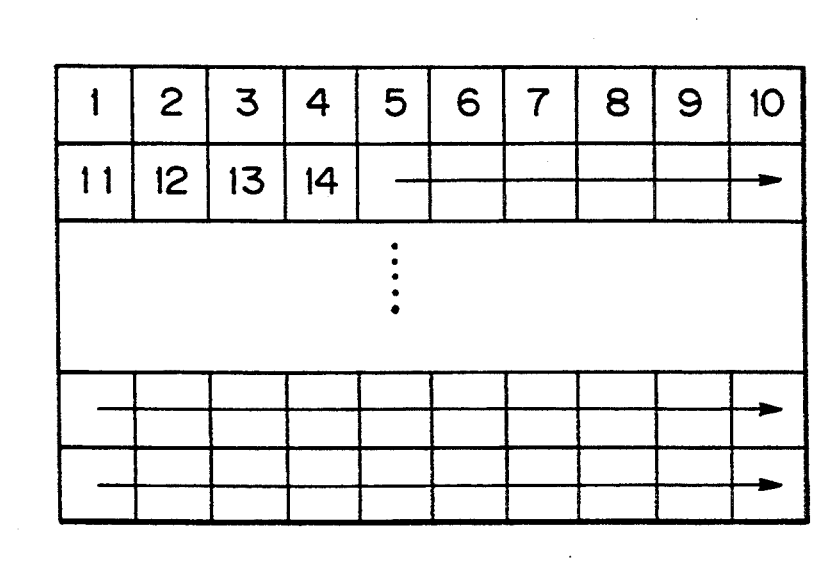

A moving picture signal is received for coding at a picture input terminal 10. The input picture signal is written into the field memory block 11. The field memory block 11 then outputs a picture signal S1. The picture signal S1 is divided into blocks of 16 picture elements by 16 picture elements (referred to as "macro blocks") which are used for motion compensated prediction. All of the blocks for one picture are transmitted according to the sequence shown in FIG. 6. Assuming that each screen is divided into 10 blocks in the horizontal direction, these blocks are numbered 1 through 10. Then the next row of 10 blocks is numbered 11 through 20. The numbering for the succeeding rows of blocks proceeds in a similar manner. For purposes of illustration as shown in FIG. 6, it has been assumed that the picture is divided in the horizontal direction into 10 blocks. However, each row of blocks may consist of more or fewer blocks than are shown in the example of FIG. 6.

Referring again to FIG. 4A, a motion predictor 12 is provided to predict motion between the block-by-block picture signal S1 and a reference picture. For example, the motion predictor 12 may perform block matching between the picture signal S1 and the reference picture. The reference picture stored in the field memory block 11 corresponds to the motion predictive reference picture signal S11 output from the field memory controller 23. Accordingly, the field memory block 1 supplies a reference picture signal S26 to motion predictor 12.

The motion predictor 12 outputs a signal S12 to a motion compensator 22. The signal S12 represents a block position on the basis of a predictive error with respect to an appropriate range for the reference picture corresponding to the motion prediction reference picture signal S11. In addition, the degree of accuracy signals S54 and S55 for the motion vector S12 are supplied to the motion compensator 22. The motion compensator 22 receives from the field memory block 21 a picture that has been locally decoded and stored in the field memory block 21. The reference picture stored in the field memory block 21 corresponds to a motion compensated reference picture signal S15 supplied thereto. On the basis of the signal received from the field memory block 21, the motion compensator 22 outputs a block picture signal S10 at an address determined on the basis of the motion vector S12.

The block picture signal S10 which is output from the motion compensator 22 has been adaptively motion-compensated. In other words, the type of motion compensation to be performed for each block is selected, on the basis of the characteristics of the input picture, from among four motion compensation modes:

(1) Forward motion compensation;
(2) Backward motion compensation;
(3) Forward and backward motion compensation (in which the reference block is formed, by averaging for example, from a reference block in a previous picture and a reference block in a future picture; and
(4) Intra-picture coding (in which no motion compensation is performed and the value of the block picture signal S10 is 0).

Mode selection is performed so as to minimize the sum of the absolute values of the differences taken pixel by pixel and in each of the four modes between the block picture signal S10 and the input block picture signal S1. The selected mode is output as a motion compensated mode signal S14 and a motion vector S13.

The input block picture signal S1 output from the field memory block 11 and the block picture signal S10 output from the motion compensator 22 are supplied to a subtractor 13 (which may be formed by an adder, for example). The subtractor 13 calculates a difference value with respect to each picture element and outputs this value as a block difference signal S2.

The block difference signal S2 is provided to a DCT circuit 14 which performs a discrete cosine transform on the blocks of difference signals and outputs a DCT coefficient signal S3. It will be understood that orthogonal transformations other than DCT may be used. One such orthogonal transformation is a fast Fourier transform (FFT).

The coefficient signal S3 is provided to a quantizer 15, for quantizing on the basis of a quantizing step signal S18 provided by a buffer memory 27 (FIG. 4B). The quantizer 15 outputs the resulting block quantized DCT coefficient signal S4. The quantizing step signal S18 is generated by the buffer memory 27 on the basis of the amount of information present in the coefficient data stored and managed by the buffer memory 27. When the amount of information present in the coefficient data increases so as to exceed a predetermined data transmission bit rate, the quantizing step S18 is adjusted to provide coarse quantization in order to decrease the quantity of information to be output.

Because the DC component of the coefficient data is particularly important for the quality of the decoded picture, the DC component usually is not quantized.

The block quantized DCT coefficient signal S4 is supplied to an inverse quantizer 18 (FIG. 4A) which is complementary to the quantizer 15. The inverse quantizer 18 converts the block quantized DCT coefficient signal S4 to a typical value corresponding to the quantizing step signal S18. Thus, the inverse quantizer 18 outputs a block signal S7. The block signal S7 is supplied to an inverse DCT circuit 19, which reverses the DCT processing performed in the DCT circuit 14. The inverse DCT circuit 19 outputs a resulting block reproduced difference signal S8.

The block reproduced difference signal S8 is provided to an adder 20, at which it is added on a pixel by pixel basis to the block picture signal S10 output from the motion compensator 22. The resulting block reproduced signal S9 is output from the adder S8 as a locally decoded picture signal. It will be appreciated that the inverse quantizer 18, the inverse DCT circuit 19, and the adder 20 constitute a local decoder.

The block reproduced signal S9 output from the adder 20 is stored in a field memory (not separately shown) which is part of the field memory block 21.

The particular field memory in which the signal S9 is stored is selected on the basis of the present picture signal S16. A reproduced picture stored in the field memory block 21 is selected on the basis of the output picture signal S17 and supplied for output at a terminal 33.

The block quantized DCT coefficient signal S4 output from the quantizer 15 is provided to a variable length coder (VLC) 26 (FIG. 4B). The VLC 26 encodes the block quantized DCT coefficient signal S4 using a variable length code such as a two-dimensional Huffman code. On the other hand, the motion vector S13 is variable length encoded at a motion vector VLC 16, which will be described below.

The respective variable length coded data output from the VLC 26 and the motion vector VLC 16 are provided to a VLC multiplexer 17. The VLC multiplexer 17 outputs a moving picture encoded signal in the form of a bit stream. The moving picture encoded signal is stored in the buffer memory 27 and output therefrom via an output terminal 13 in the form of a bit stream at a predetermined data transmission rate.

In the above-described coding apparatus, the range and the degree of accuracy of the motion vector can be changed on a picture by picture basis, or for each sequence of moving pictures, in accordance with the required picture quality.

Upon assignment of a range for a forward motion vector, the forward motion vector range signal S52 and the backward motion vector range signal S53 are transmitted as part of a sequence header or a picture header. A sequence header is transmitted at the beginning of a bit stream, whereas a picture header is transmitted when the picture start flag S22 goes high.

In the following description, "forward_ f" and "backward_ f" indicate the magnitude by which the range of a forward motion vector and a backward motion vector, respectively, are to be extended.

The motion vector range signals S52 and S53 are supplied to the motion predictor 12 (FIG. 4A) and the motion vector VLC 16 (FIG. 4B). The purpose of the motion vector range signals S52 and S53, as the same affect operation of the motion predictor 12 and the motion vector VLC 16, will now be described.

The motion predictor 12 selects a motion vector signal S12 for each picture block to be encoded from a range that is based on the value of forward_ f and backward_ f. It will be understood that forward_ f and backward_ f are indicative of a distance between the picture being coded and a reference picture. This distance can also be thought of as an interval between the present picture and the reference picture with the interval being measured in terms of a picture period such as a frame period or a field period.

Assuming first that the distance between pictures is 1 (i.e., forward_ f or backward_ f=1), then the vertical and horizontal ranges for the motion vector are ±M picture elements with respect to the origin. When the distance between pictures is 2, the vertical and horizontal ranges for the motion vector are ±2M picture elements with respect to the origin. When the distance between pictures is N, the vertical and horizontal ranges for the motion vector are plus or minus N×M picture elements where N corresponds to forward_ f or backward_ f.

The motion vector signal S12 is provided to the motion compensator 22, which outputs a selected motion compensation mode signal S14 and the corresponding motion vector signal S13. The motion vector signal S13 is then supplied to the motion vector VLC 16.

The motion vector VLC 16 contains only a single reference variable length coding table which corresponds to the case in which the distance between pictures is one (i.e., forward_ f or backward_ F=1) but the same table is also used to code the values of motion vectors formed with respect to a variety of ranges which correspond to a variety of values for forward_ f or backward_ f. As will be seen, this is accomplished by extending or replacing the values in the variable length coding table in accordance with the appropriate range for the selection of the motion vector by performing calculations with respect to the motion vector to be coded.

The calculations which accomplish extension of the VLC table can, for example, change the range of the VLC table from ±16 picture elements to ±32 picture elements or ±48 picture elements. On the other hand, calculations corresponding to a replacement of the VLC table permit a VLC table which represents a degree of accuracy of one picture element to be used to code a motion vector value with a degree of accuracy of 0.5 picture element.

An example of a variable length coding table to be used for establishing motion vector values with a degree of accuracy of one picture element and over a range of plus or minus 16 picture elements is shown in Table 1.

TABLE 1

| (Reference Table) | |
|---|---|
| VARIABLE LENGTH CODE | MOTION CODE |
| 0000 0011 001 | −16 |
| 0000 0011 011 | −15 |
| 0000 0011 101 | −14 |
| 0000 0011 111 | −13 |
| 0000 0100 001 | −12 |
| 0000 0100 011 | −11 |
| 0000 0100 11 | −10 |
| 0000 0101 01 | −9 |
| 0000 0101 11 | −8 |
| 0000 0111 | −7 |
| 0000 1001 | −6 |
| 0000 1011 | −5 |
| 0000 111 | −4 |
| 0001 1 | −3 |
| 0011 | −2 |
| 011 | −1 |
| 1 | 0 |
| 010 | 1 |
| 0010 | 2 |
| 0001 0 | 3 |
| 0000 110 | 4 |
| 0000 1010 | 5 |
| 0000 1000 | 6 |
| 0000 0110 | 7 |
| 0000 0101 10 | 8 |
| 0000 0101 00 | 9 |
| 0000 0100 10 | 10 |
| 0000 0100 010 | 11 |
| 0000 0100 000 | 12 |
| 0000 0011 110 | 13 |
| 0000 0011 100 | 14 |
| 0000 0011 010 | 15 |
| 0000 0011 000 | 16 |

Use of the variable length coding table shown in Table 1 (which is sometimes referred to as a "reference table") for assigning motion vectors with respect to a plurality of motion vector ranges is illustrated with reference to a flow chart shown in FIG. 11. In the flow chart of FIG. 11 the symbol "a" represents a constant coefficient that is a positive integer and is selected in relation to the reference table; the symbols "[]" are indicative of the largest integer that is less than or equal to the value of the expression within the symbol (i.e., [r] is defined as the largest integer that is less than or equal to r); and the symbol "%" is used with two operands and indicates an operation which yields a value equal to the remainder obtained by dividing the second operand into the first operand.

Figure 11:
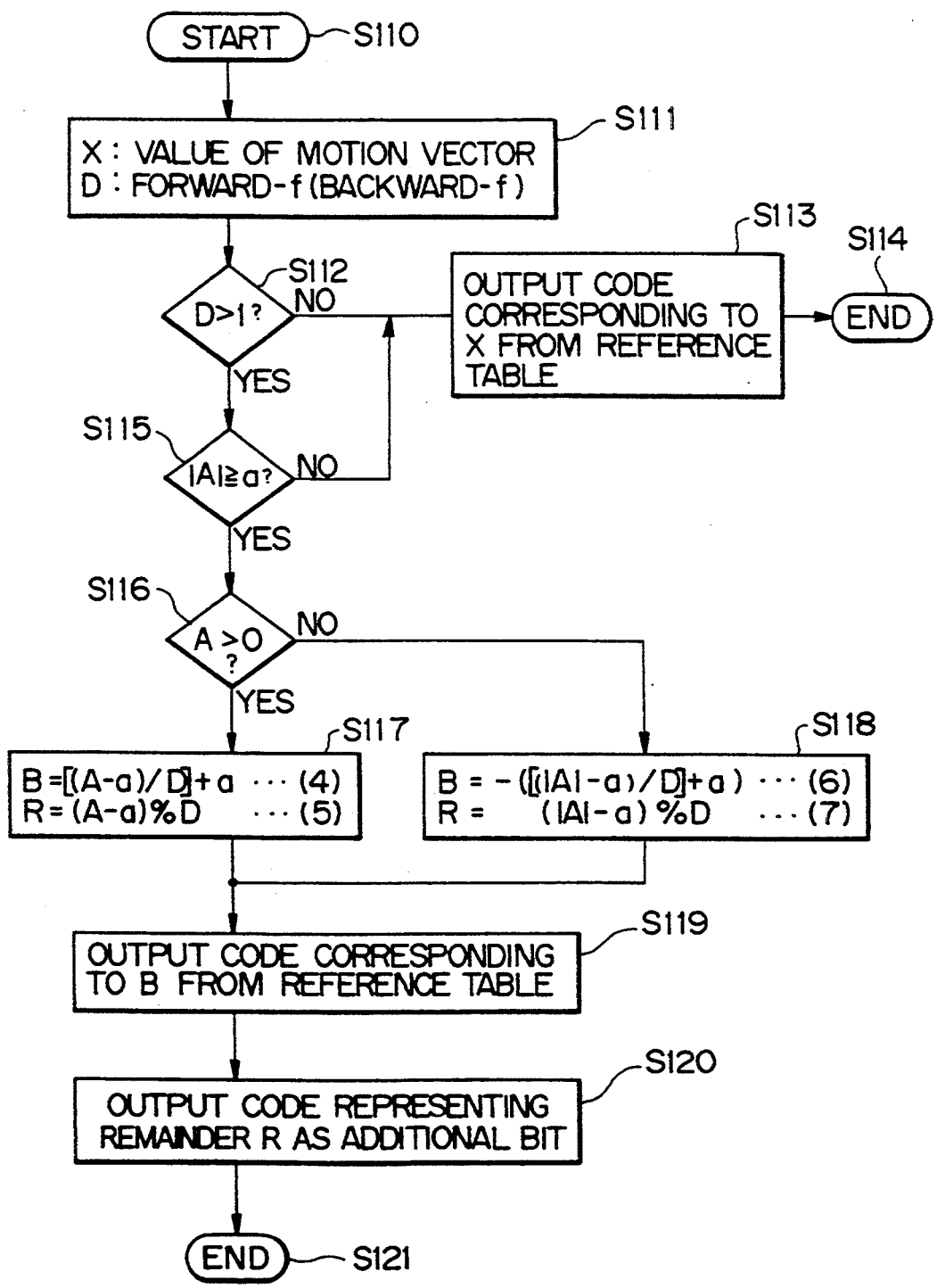
FIG. 11 is a flow chart that illustrates a procedure for variable length coding motion vectors in accordance with the present invention.

In FIG. 11, step 110 indicates the starting point of the procedure, and at step S111, A is an input value which is the motion vector value to be encoded and D is forward _ f or backward _ f, that is, the interval between the picture to be coded and a reference picture, expressed, e.g., in terms of a frame period.

The procedure of FIG. 11 branches at step S112 according to whether D is greater than 1. If not, i.e., if D equals 1, then step S113 follows, at which the input motion vector value A is used to access the reference table to obtain a corresponding variable length code value, which is provided as the output coded value of motion vector VLC 16. The procedure then ends (step S114).

However, if D is greater than 1, then the routine branches from step S112 to step S115, at which it is determined whether the absolute value of A is greater than or equal to a. If not, i.e., if the absolute value of A is less than a, then the routine again branches to steps S113 and S114 as just described. Otherwise, the routine proceeds to step S116, at which it is determined whether or not the input motion vector value is positive (i.e., greater than 0). If so, the routine proceeds to Step S117, at which an access value B and a remainder R are calculated on the basis of the following equations (4) and (5), respectively:

$$B=[(A-a)/D]+a \qquad (4)$$

$$R=(A-a)\%D \qquad (5)$$

Otherwise (i.e., if A is negative), then B and R are calculated in accordance with equations (6) and (7) as shown below:

$$B=-([|A|-a]/D]+a) \qquad (6)$$

$$R=(|A|-a)\%D \qquad (7)$$

The procedure of FIG. 11 then precedes to step 119, at which the access value B (calculated at step S117 or step S118, as the case may be) is used to access the reference table so that a variable length code value corresponding to the access value B is obtained.

After step S119 is step S120, at which a code representing the remainder R is appended as an additional signal (which includes an additional bit or additional bits) to the variable length code value obtained using the access value B. The result is then output from motion vector VLC 16 as the variable length code for the input motion vector and the procedure then ends (step S121).

There will next be considered a more specific case of the procedure illustrated in FIG. 11, in which the coefficient a is equal to 1.

In this case, if A equals 0, then the reference table shown in Table 1 is used without performing any calculation, regardless of the value of D (i.e., regardless of the value of forward _ f or backward _ f).

If A is positive, then B and R are calculated as follows:

$$B=[(A-1)/D]+1 \quad (8)$$

$$R=(A-1)\%D \quad (9)$$

On the other hand, if A is negative, then B and R are calculated in accordance with the following equations:

$$B=-([(|A|-1)/D]+1) \quad (10)$$

$$R=(|A|-1)\%D \quad (11)$$

Thus, as shown in Tables 2 and 3, when D=2 (forward_ f or backward_ f=2) and D=3 (forward_ f or backward_ f=3), Table 1 is in effect extended so as to form variable length coding tables which respectively have a range of ±32 picture elements and a range of ±48 picture elements, in each case with a degree of accuracy of 1 picture element.

TABLE 2

| | (D = 2) | |
|---|---|---|
| MOTION VLC CODE | b = 0<br>R = 0 | b = 1<br>R = 1 |
| 0000 0011 001 b | −31 | −32 |
| 0000 0011 011 b | −29 | −30 |
| 0000 0011 101 b | −27 | −28 |
| 0000 0011 111 b | −25 | −26 |
| 0000 0100 001 b | −23 | −24 |
| 0000 0100 011 b | −21 | −22 |
| 0000 0100 11 b | −19 | −20 |
| 0000 0101 01 b | −17 | −18 |
| 0000 0101 11 b | −15 | −16 |
| 0000 0111 b | −13 | −14 |
| 0000 1001 b | −11 | −12 |
| 0000 1011 b | −9 | −10 |
| 0000 111 b | −7 | −8 |
| 0001 1 b | −5 | −6 |
| 0011 b | −3 | −4 |
| 011 b | −1 | −2 |
| 1 | 0 | |
| 010 b | 1 | 2 |
| 0010 b | 3 | 4 |
| 0001 0 b | 5 | 6 |
| 0000 110 b | 7 | 8 |
| 0000 1010 b | 9 | 10 |
| 0000 1000 b | 11 | 12 |
| 0000 0110 b | 13 | 14 |
| 0000 0101 10 b | 15 | 16 |
| 0000 0101 00 b | 17 | 18 |
| 0000 0100 10 b | 19 | 20 |
| 0000 0100 010 b | 21 | 22 |
| 0000 0100 000 b | 23 | 24 |
| 0000 0011 110 b | 25 | 26 |
| 0000 0011 100 b | 27 | 28 |
| 0000 0011 010 b | 29 | 30 |
| 0000 0011 000 b | 31 | 32 |

TABLE 3

| | (D = 3) | | |
|---|---|---|---|
| MOTION VLC CODE<br>(NOTE) | bb = 0<br>R = 0 | bb = 1<br>R = 1 | bb = 11<br>R = 2 |
| 0000 0011 001 bb | −46 | −47 | −48 |
| 0000 0011 011 bb | −43 | −44 | −45 |
| 0000 0011 101 bb | −40 | −41 | −42 |
| 0000 0011 111 bb | −37 | −38 | −39 |
| 0000 0100 001 bb | −34 | −35 | −36 |
| 0000 0100 011 bb | −31 | −32 | −33 |
| 0000 0100 11 bb | −28 | −29 | −30 |
| 0000 0101 01 bb | −25 | −26 | −27 |
| 0000 0101 11 bb | −22 | −23 | −24 |
| 0000 0111 bb | −19 | −20 | −21 |
| 0000 1001 bb | −16 | −17 | −18 |
| 0000 1011 bb | −13 | −14 | −15 |
| 0000 111 bb | −10 | −11 | −12 |
| 0001 1 bb | −7 | −8 | −9 |
| 0011 bb | −4 | −5 | −6 |
| 011 bb | −1 | −2 | −3 |
| 1 | 0 | | |
| 010 bb | 1 | 2 | 3 |
| 0010 bb | 4 | 5 | 6 |
| 0001 0 bb | 7 | 8 | 9 |
| 0000 110 bb | 10 | 11 | 12 |
| 0000 1010 bb | 13 | 14 | 15 |
| 0000 1000 bb | 16 | 17 | 18 |
| 0000 0110 bb | 19 | 20 | 21 |
| 0000 0101 10 bb | 22 | 23 | 24 |
| 0000 0101 00 bb | 25 | 26 | 27 |
| 0000 0100 10 bb | 28 | 29 | 30 |
| 0000 0100 010 bb | 31 | 32 | 33 |
| 0000 0100 000 bb | 34 | 35 | 36 |
| 0000 0011 110 bb | 37 | 38 | 39 |
| 0000 0011 100 bb | 40 | 41 | 42 |
| 0000 0011 010 bb | 43 | 44 | 45 |
| 0000 0011 000 bb | 46 | 47 | 48 |

When D=2, the remainder R has a value "0" or "1", and is accordingly represented by a 1-bit unsigned integer. When D=3, the remainder R has the value "0", "1" or "2", so that the additional signal representing the remainder R is represented by a 2-bit unsigned integer. Alternatively, when D=3, the additional signal may take the form of a variable length code so that, as shown in Table 3, the code (bb) values 0, 10, 11 are provided as the additional signals respectively representing R=0, R=1 and R=2.

There will next be described use of the reference table (Table 1) for variable length encoding a motion vector having a degree of accuracy of 0.5 picture element (half_ pel) and a range of +8 picture elements. In this case, the input motion vector value is multiplied by 2 (i.e., where the vector is represented by (X, Y) the products 2X and 2Y are formed), and the result of the multiplication is used as an access value for accessing the reference table. For example, if the input vector value X equals 1.5, the value 2X=3 is used to access the reference table. In effect, then, when the reference table shown in Table 1 is used to encode input motion vectors with a degree of accuracy of 0.5 picture element, the vector values −16, −15, −14, . . . , 0, . . . +14, +15, +16 are replaced with −8.0, −7.5, −7.0, . . . , 0, . . . +7.0, +7.5, +8.0.

The variable length coding table extension performed with respect to motion vectors having a one picture element degree of accuracy can also be performed with respect to motion vectors having a 0.5 picture element degree of accuracy. In this case, the procedure of FIG. 11 still applies, but the same with A being the value of a motion vector having a degree of accuracy of 0.5 picture elements and with the following equations (12)–(15) replacing the equations (4)–(7) shown in FIG. 11.

$$B=[(2\times A-a)/D]+a \quad (12)$$

$$R=(2\times A-a)\%D \quad (13)$$

$$B=-([(|2\times A|-a)/D]+a) \quad (14)$$

$$R=(|2\times A|-a)\%D \quad (15)$$

Further, at step 115 of FIG. 11 the absolute value of 2A, rather than the absolute value of A, is compared with a.

For example, Table 2 represents a virtual extension of Table 1 to serve a range of ±32 picture elements with a degree of accuracy of 1 picture element. If it is desired to provide a 0.5 picture element degree of accuracy with D=2, then the values −32, −31, −30, ..., 0, .. ., +30, +31, +32 of Table 2 are, in effect, replaced with −16.0, −15.5, −15.0, ..., 0, ..., +15,0, +15.5, +16.0. Similarly, for D=3, the values −48, −47, −46, ..., 0, ..., +46, +47, +48 of Table 3 are replaced with −24.0, −23.5, −23.0, ..., 0, ..., +23.0, +23.5, +24.0.

When a variable length encoded motion vector is transmitted, the flags S54 and S55, indicating a degree of accuracy of 1 picture element of 0.5 picture element, are also transmitted for each picture or sequence of pictures. The flag S54 represents the degree of accuracy for a forward motion vector, and the flag S55 represents the degree of accuracy for a backward motion vector.

Figure 7:
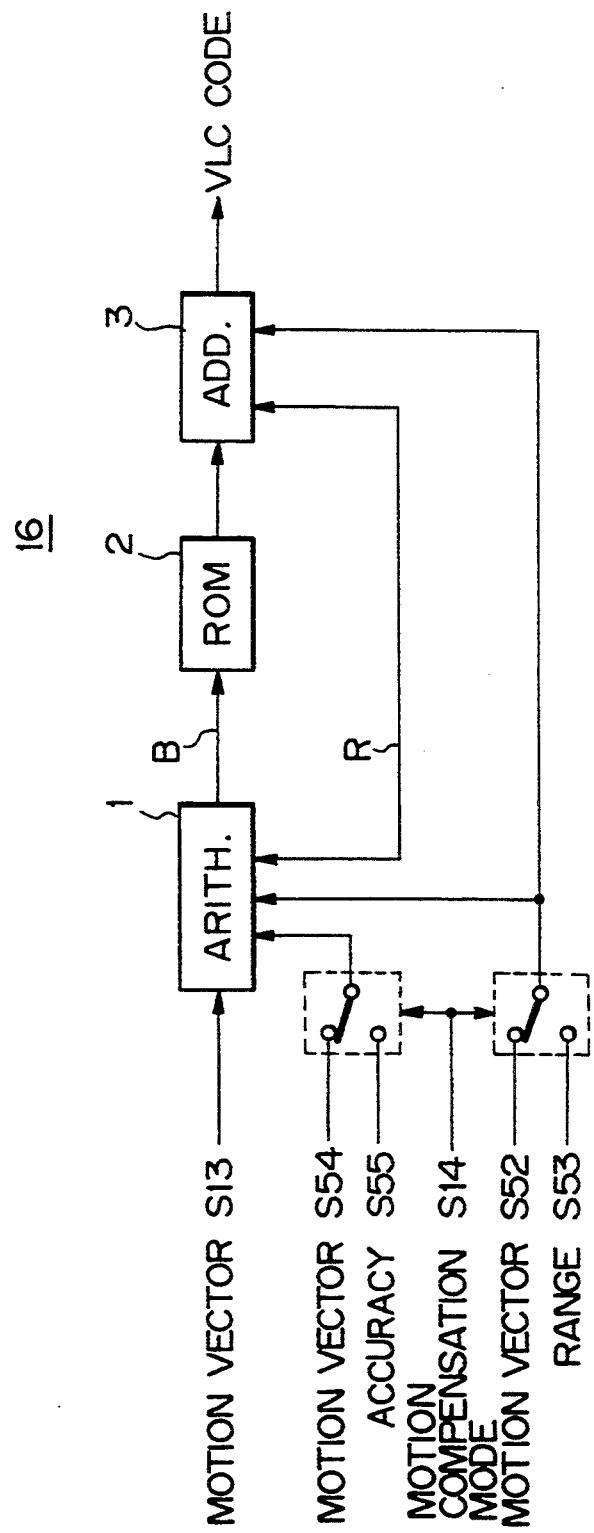
FIG. 7 is a block diagram of an embodiment of a motion vector variable length coding (VLC) circuit that is part of the apparatus of FIGS. 4A-4B.

FIG. 7 is a block diagram of a motion vector VLC circuit 16 which is part of the variable length coding circuit of FIG. 4B. As shown in FIG. 7, the input motion vector value S13, the signal S52 or S53 which represents the range with respect to which the input motion vector value was formed, and the signal S54 or S55, which represents the degree of accuracy of the motion vector, are all supplied to an arithmetic circuit 1. Selections between the signals. S54 and S55 and between the signals S52 and S53 are made in accordance with the motion compensation mode signal S14. As indicated above, when the degree of accuracy of the motion vector is 0.5 picture element, the arithmetic circuit 1 multiplies the input motion vector value by two. The arithmetic circuit 1 also performs the arithmetic operations to obtain the access value B and the remainder R in accordance with the procedure of FIG. 11 (i.e., the arithmetic circuit 1 performs the calculations indicated by the appropriate ones of equations (4)–(7) or (12)–(15)).

A variable length coding table such as that shown in Table 1 is stored in a ROM 2. When D=1 (i.e., forward_ f or backward_ F=1) the value of the motion vector (multiplied by two if appropriate) is provided directly to the ROM 2 as an addressing signal. Otherwise (i.e., if D is greater than 1), an address corresponding to the access value B is generated by the arithmetic circuit 1, in the manner described above, and the access value B is provided as an addressing signal to the ROM 2.

When D=1, a variable length code value obtained from the ROM 2 on the basis of the input motion vector value (doubled if appropriate) is output directly as the variable length code value for the motion vector. Otherwise (for D greater than 1), an addition circuit 3 appends a code (additional bit or bits) representative of the remainder R as least significant bit or bits to the variable length code output from the ROM 2. As a result, the output signal from the ROM 2, with the additional bit or bits appended thereto, is output as the variable length code for the motion vector.

In this way, since calculations are performed which virtually extend the reference variable length coding table and/or replace the values thereof, the variable length coding can be performed for motion vectors having various respective ranges and degrees of accuracy while using only a single reference table.

An embodiment of a moving picture decoding apparatus in accordance with present invention, and corresponding to the moving picture and coding apparatus described above, will now be described with reference to FIG. 5.

In the apparatus of FIG. 5 a bit stream signal is received at an input terminal 50. The bit stream signal is stored in a buffer memory 51 and sent therefrom to a VLC demultiplexer 53. Respective output signals from the VLC demultiplexer 53 are sent to a motion vector variable length decoder (VLD) 54 and a second variable length decoder 52.

The VLD 52 decodes header data within the bit stream in order to obtain picture decoding control data. The picture decoding control data obtained at VLD 52 is stored in a control information storage memory 62. The control data includes, for example, a bit rate signal and a picture frame size signal.

When the VLD 52 receives a picture start cede, it causes a picture start flag S102 to go high and also causes the control information storage memory 62 to store the picture decoding control data. The control data includes, for example, motion compensated reference picture signals S90 and S91, motion vector range signals S92 and S93, and motion vector degree of accuracy signals S94 and S95. Of these signals, the signals S90, S92 and S94 are reference and control signals with respect to forward motion compensation, whereas the signals S91, S93 and S95 are reference and control signals with respect to backwards motion compensation.

A control data signal 104 representing data stored in the control information storage memory 62 controls the moving picture decoding apparatus of FIG. 5 so as to operate as described below.

The picture start flag S102 and the motion compensated reference picture signals S90 and S91 are supplied to a field memory controller 61. The field memory controller 61, in turn, outputs motion compensated reference picture signals S51 and S59 and an output picture signal S60 to a field memory block 58.

The VLD 52 outputs a 2-dimensional block DCT coefficient signal S80 to an inverse quantizer 55, which converts the signal S80 into a typical value of a quantizing step based upon a quantizing step signal S57 received from the VLD 52. The resulting signal is output from inverse quantizer 52 as a block signal S81, which is supplied to an inverse DCT circuit 56. The inverse DCT circuit. 56 performs an inverse transformation on the coefficient data to produce difference data, which is output as a block reproduced difference signal S82.

The demultiplexer 53 outputs to the motion vector VLD 54 a motion vector VLC code S40 with respect to the macro block being decoded. The motion vector VLD 54, which will be described in more detail below, in turn outputs a motion vector S61.

The motion vector S61 is supplied to a motion compensator 59, which also receives a motion compensation mode signal S62 from the VLD 52. On the basis of the signals S61 and S62 and a decoded picture signal stored in field memory block 58 and provided to the motion compensator 59, the motion compensator 59 generates a block picture signal S83.

More specifically, when the motion compensated reference picture signal S58 is received, an appropriate reproduced picture is stored in the field memory block 58 as a reference picture. The motion compensator 59 generates the block picture signal S83 on the basis of an address formed from the motion compensated mode signal S62 and the motion vector S61.

The motion compensator 59 performs an adaptive motion compensation operation in accordance with the motion compensation mode signal S62. In other words, one of the following four operations is performed with respect to each block:

(1) Forward motion compensation;
(2) Backward motion compensation;
(3) Forward and backward motion compensation (in which the reference block is formed, by averaging for example, from a reference block in a previous picture and a reference block in a future picture); and
(4) Intra-picture decoding (in which no motion compensation is performed so that the output of the block picture signal S83 is 0).

The block reproduced difference signal S82 output from the inverse DCT circuit 56 is added at an adder 57 to the block picture signal S83 output from the motion compensator 59. This adding is performed picture element by picture element. The resulting block reproduced signal S84 is output from the adder 57 for storage in the field memory corresponding to the present picture signal S59 (the field memory being included in field memory block 58). A reproduced picture corresponding to the output signal S60 that was stored in the field memory block 58 is output via a terminal 60.

It will be seen that the apparatus of FIG. 5 operates to form a picture signal by decoding a received bit stream.

As will now be described, the apparatus also adaptively changes the decoding method for the motion vectors on the basis of motion vector range and degree of accuracy information received with respect to each picture or sequence of pictures.

A range with respect to a forward motion vector is indicated on the basis of a signal S92 present in a sequence header or picture header and corresponding to the value "forward_ f". Similarly, the range for a backward motion vector is indicated by a signal S93 present in a sequence header or picture header and corresponding to the value "backward_ f". The signals S92 and S93 are supplied to the motion vector VLD 54 and affect the operations of the motion vector VLD 54 in a manner which will now be described.

The motion vector VLD 54 includes a single variable length coding reference table (Table 1, for example) designed for D=1 (forward_ f or backward_ f=1.) Calculations are performed within the motion vector VLD 54 so as to, in effect, extend the reference table so that motion vector VLD 54 can decode motion vector values selected on the basis of a plurality of ranges.

Figure 12:
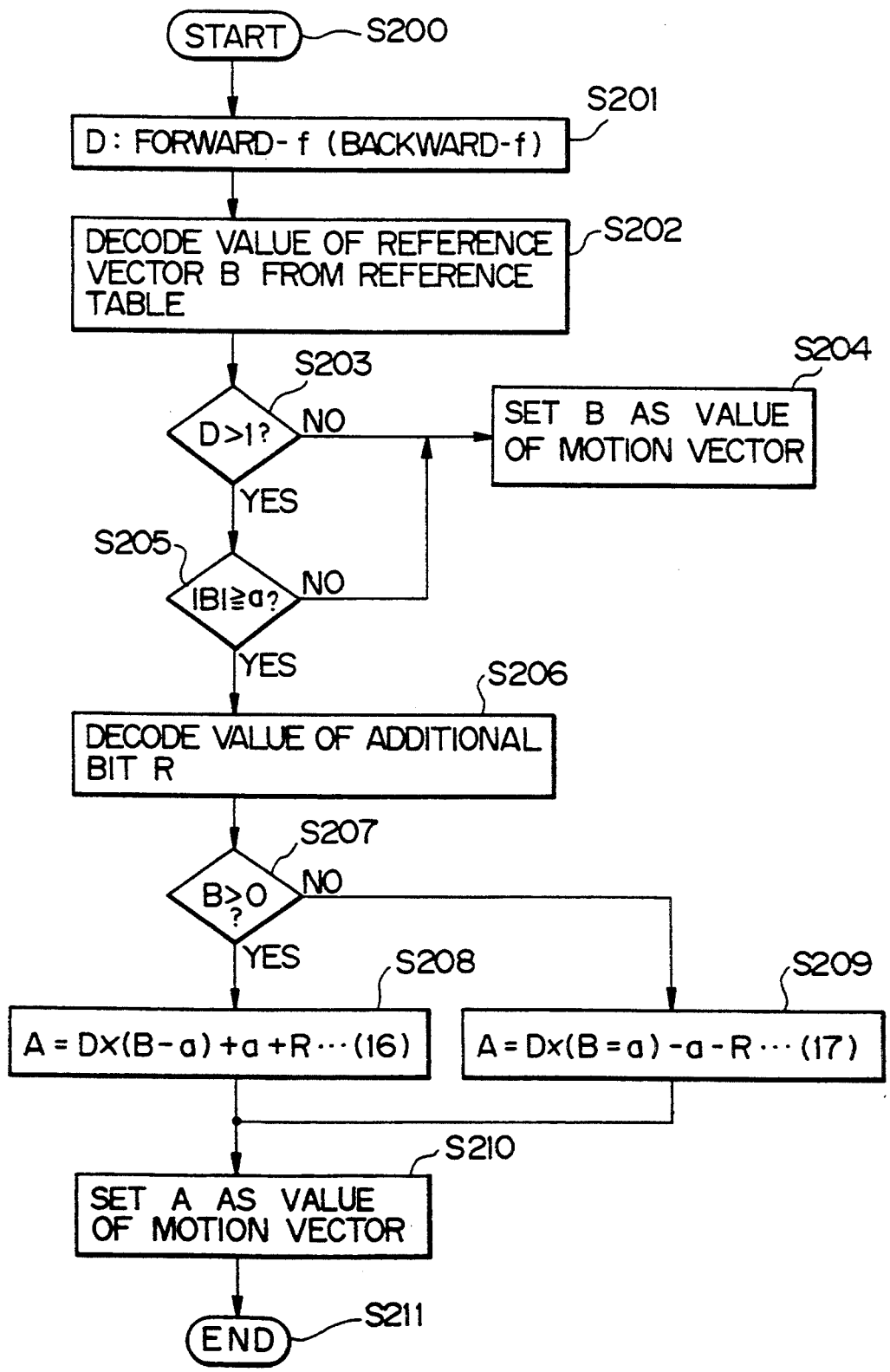
FIG. 12 is a flow chart that illustrates a procedure for decoding variable length coded motion vectors in accordance with the present invention.

FIG. 12 is a flow chart of a procedure for decoding motion vector values in accordance with the invention, with virtual extension of the single reference table, when needed.

It will be understood that if a reference table like Table 1 was used in encoding the motion vector, then the same reference table is provided for decoding.

In FIG. 12, the decoding procedure is shown to start at step S200, and then at step S201 the value D is established on the basis of received flag information or the like, with D referring to the distance or interval between the picture being decoded and a reference picture, as was the case with respect to the procedure FIG. 11. The next step is step S202 at which the reference table is accessed on the basis of a received variable length code value to obtain a motion vector value B.

This value B will sometimes be referred to as the "nominal motion vector value".

At step S203 the procedure of FIG. 12 branches depending on whether D is greater than 1. If not, the nominal motion vector value B is simply taken as the value of the motion vector (step S204). Otherwise, i.e., if D is greater than 1, it is determined whether the absolute value of B is greater than or equal to a (which has the same meaning as in the procedure of FIG. 11). If the absolute value of D is not greater than or equal to a, then the procedure again branches to step S204 so that the nominal value B is taken to be the motion vector value. Otherwise, an additional signal (e.g., an additional bit) is decoded (step S206) to provide a value of a remainder R. Next it is determined whether the nominal value B is positive (step S207). If so, the motion vector value A is calculated according to equation (16) below. Otherwise, i.e., if B is negative, equation (17) is used to calculate the motion vector value A.

$$A = D \times (B-a) + a + R \quad (16)$$

$$A = D \times (B+a) - a - R \quad (17)$$

In either case, the calculated value A is taken to be the value of the motion vector (step S210) and the procedure is concluded (step S211).

It will be understood that the decoding of the additional signal to generate the remainder R, performed at step S206, is the inverse of the coding formed at step S120 at FIG. 11. For example, where D=2, the additional signal representing R is a one bit code, and when D=3, R may be represented by a 2-bit additional signal or by a variable length additional signal consisting of one or two bits.

There will next be described decoding of a motion vector (represented by the horizontal value X and a vertical value Y) formed with a degree of accuracy of 0.5 picture element.

In this case, the vector values obtained by the procedure of FIG. 12 are divided by two (yielding X/2 or Y/2) to provide the decoded motion vector value. The flags S94 and S95, representing either the one picture element or the 0.5 picture element degree of accuracy, are received for each picture or sequence of pictures. The flag S94 represents the degree of accuracy for a forward motion vector, and the flag S95 represents the degree of accuracy for a backward motion vector. These flags are included in the bit stream and are used by the decoding apparatus of FIG. 5 to decode the coded pictures from the bit stream.

Figure 8:
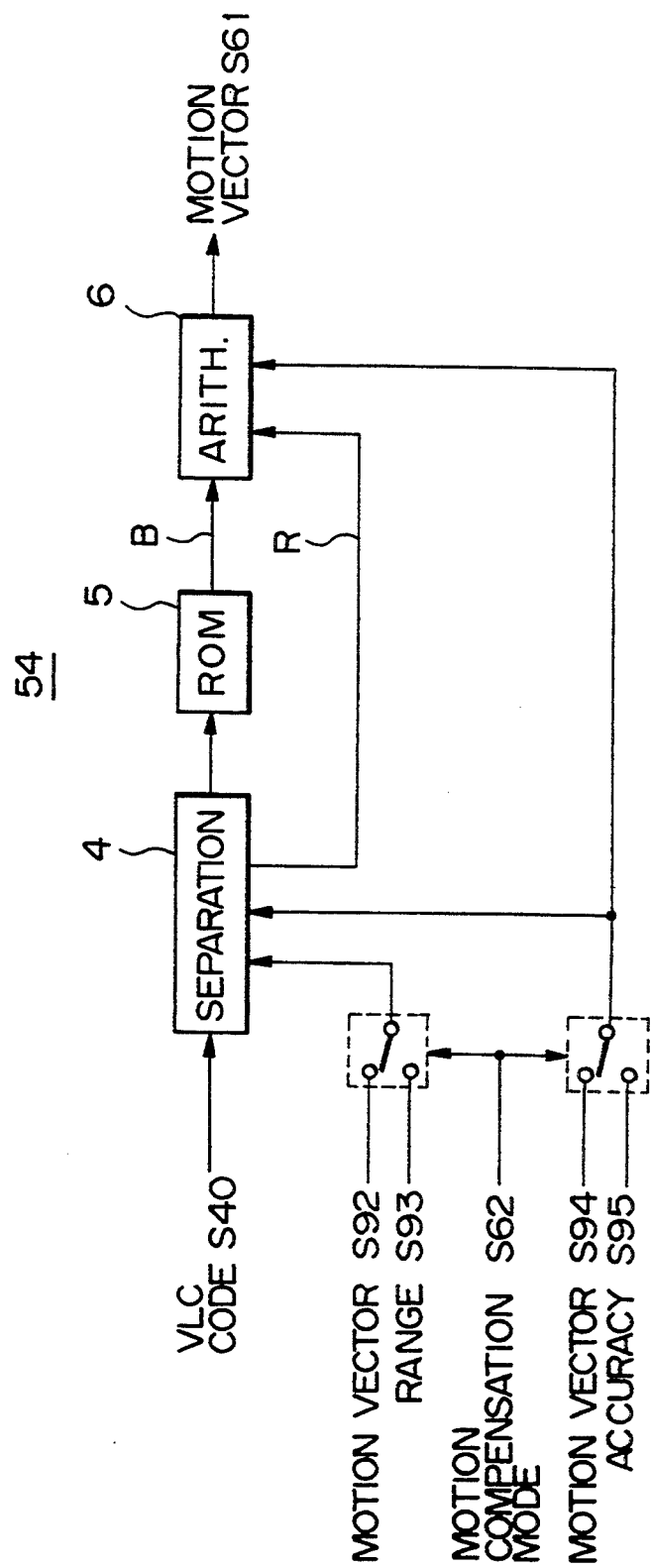
FIG. 8 is a block diagram of a motion vector variable length decoding (VLD) circuit that is part of the apparatus of FIG. 5.

FIG. 8 is a block diagram of an embodiment of the motion vector VLD 54 which is part of the decoding circuit of FIG. 5. In FIG. 8, a variable length coding reference table such as Table 1 is stored in a ROM 5. A separating circuit 4 receives a VLC code S40, a selected one of motion vector range signals S92 and S93 and a selected one of motion vector degree of accuracy signals S94 and S95. The selection between the signals S92 and S93, and between the signals S94 and S95, is made on the basis of a motion compensation mode signal S62.

On the basis of the VLC code signal S40 and the signals S92 and S94 or S93 and S95, the separation circuit outputs a variable length code signal to the ROM 5 so that the nominal motion vector value B is obtained from the ROM 5. If the encoded motion vector value is non-zero, and if D is greater than one, then the VLC code S40 received by the separation circuit 4 includes an additional signal containing one or more additional bits representing a remainder R. In that case, the separating circuit 4 separates the additional signal from the VLC code S40 to provide a truncated variable length code value which is output to the ROM 5 to obtain the nominal vector value B.

When D=1, the output B from ROM 5 is output as the motion vector value signal S61. Otherwise, an arithmetic circuit 6 performs a calculation in accordance with equation (16) or equation (17) to produce the decoded motion vector value S61. That calculation is also based on the remainder R which is provided from the separation circuit 4 after the separation circuit 4 decodes the additional signal separated from the VLC code S40.

It will also be appreciated that when the degree of accuracy of the motion vector is 0.5 picture element, the nominal value B is divided by 2 at the arithmetic circuit 6.

Accordingly, in the variable length decoding circuit of FIG. 5, the variable length coded motion vector corresponding to one of a plurality of ranges and one of a plurality of degrees of accuracy can be decoded using a single reference table by performing calculations that, in effect, extend the reference table and/or replace values thereof.

There will next be described an example of a method for transmitting values of forward_f and backward_f.

As indicated before, forward_f and backward_f each represent a multiple of the motion vector range for which a reference variable length coding table was provided. Based on the value of forward_f and backward_f, the coding apparatus and decoding apparatus described herein determine the length of the additional signal (additional bit code) which is appended to the VLC provided by the reference table. Table 4 shows the relations among forward_f or backward_f, the remainder R, and the code length of the additional signal for transmitting the value of the remainder R (i.e., the number of additional bits). (The symbol "FLC" used in the following table means "fixed length code".)

TABLE 4

| FORWARD_F (BACKWARD_F) | REMAINDER R | CODE LENGTH NECESSARY FOR TRANSMITTING R (ADDITIONAL BITS) |
| --- | --- | --- |
| 1 | 0 | 0 |
| 2 | 0,1 | 1bit_FLC or VLC |
| 3 | 0,1,2 | 2bit_FLC or VLC |
| 4 | 0,1,2,3 | 2bit_FLC or VLC |
| 5 | 0,1,2,3,4 | 3bit_FLC or VLC |
| 6 | 0,1,2,3,4,5 | 3bit_FLC or VLC |
| 7 | 0,1,2,3,4,5,6 | 3bit_FLC or VLC |
| 8 | 0,1,2,3,4,5,6,7 | 3bit_FLC or VLC |
| . | . | . |
| . | . | . |
| . | . | . |
| 16 | 0,1,2 . . . ,13,14,15 | 4bit_FLC or VLC |
| . | . | . |
| . | . | . |
| 32 | 0,1,2 . . . ,29,30,31 | 5bit_FLC or VLC |
| . | . | . |
| . | . | . |
| 64 | 0,1,2 . . . ,61,62,63 | 6bit_FLC or VLC |
| . | . | . |
| . | . | . |

Finally, there will be described an embodiment of the present invention in which motion vector values are encoded with differential PCM (DPCM), so that the data transmitted with respect to motion vector values represents only the differences between motion vector values for adjacent blocks. An encoder according to this embodiment takes advantage of the strong spatial correlation of the motion vector values and forms difference values representing differences between motion vectors in adjacent blocks so that the resulting difference values are concentrated around 0. The difference values are then variable length encoded in a motion vector VLC.

Figure 9:
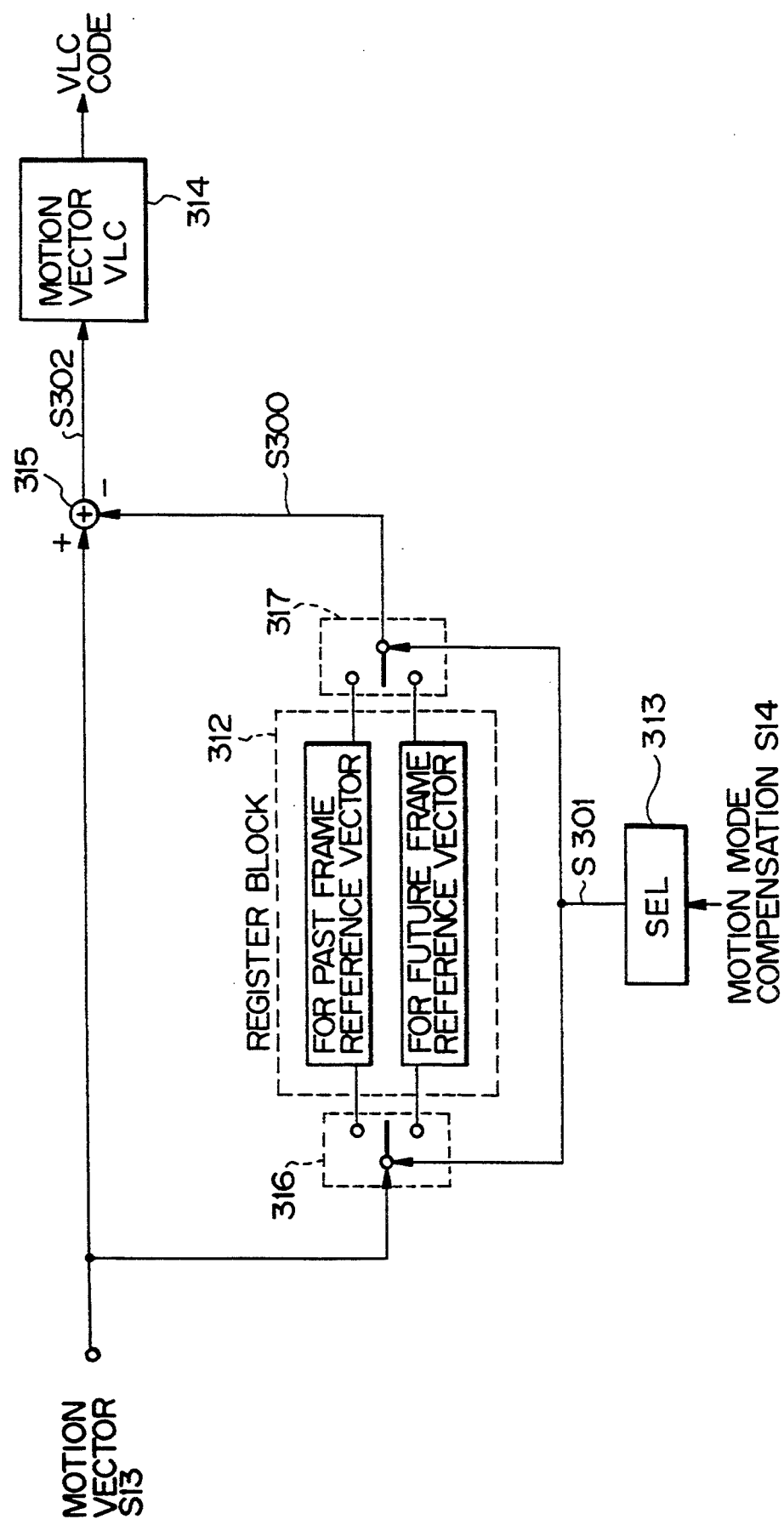
FIG. 9 is a block diagram of a difference circuit used in difference coding motion vectors in accordance with an embodiment of the invention.

FIG. 9 is a block diagram of a difference circuit which forms the difference values for the motion vectors. The motion compensation mode signal S14, as described above, is supplied to a selector 313. The selector 313 outputs a register switching signal S301 to switches 316 and 317 associated with a register block 312. The switches 316 and 317 are controlled by the register switching signal S301. A motion vector S300 (represented by a horizontal value X2 and a vertical value Y2) is read out from the register block 312 and supplied through the switch 317 to a subtractor 315. The subtractor 315 is also supplied with an input motion vector S13 (represented by horizontal value X1 and vertical value Y1). The subtractor 315 forms a difference vector S302 (X1-X2, Y1-Y2). The difference vector S302 is supplied to a motion vector VLC 314, which encodes the difference vector S302 in the form of a variable length code.

The input motion vector S13 is input through switch 316 to one of the two registers of register block 312. The particular register into which the motion vector S13 is written is determined by register switching signal S301. Accordingly, a motion vector applicable to a past picture and a motion vector applicable to a future picture are independently subject to the difference operation. Because of the difference operation, the range of the difference motion vectors is twice the range of the input motion vectors.

Figure 10:
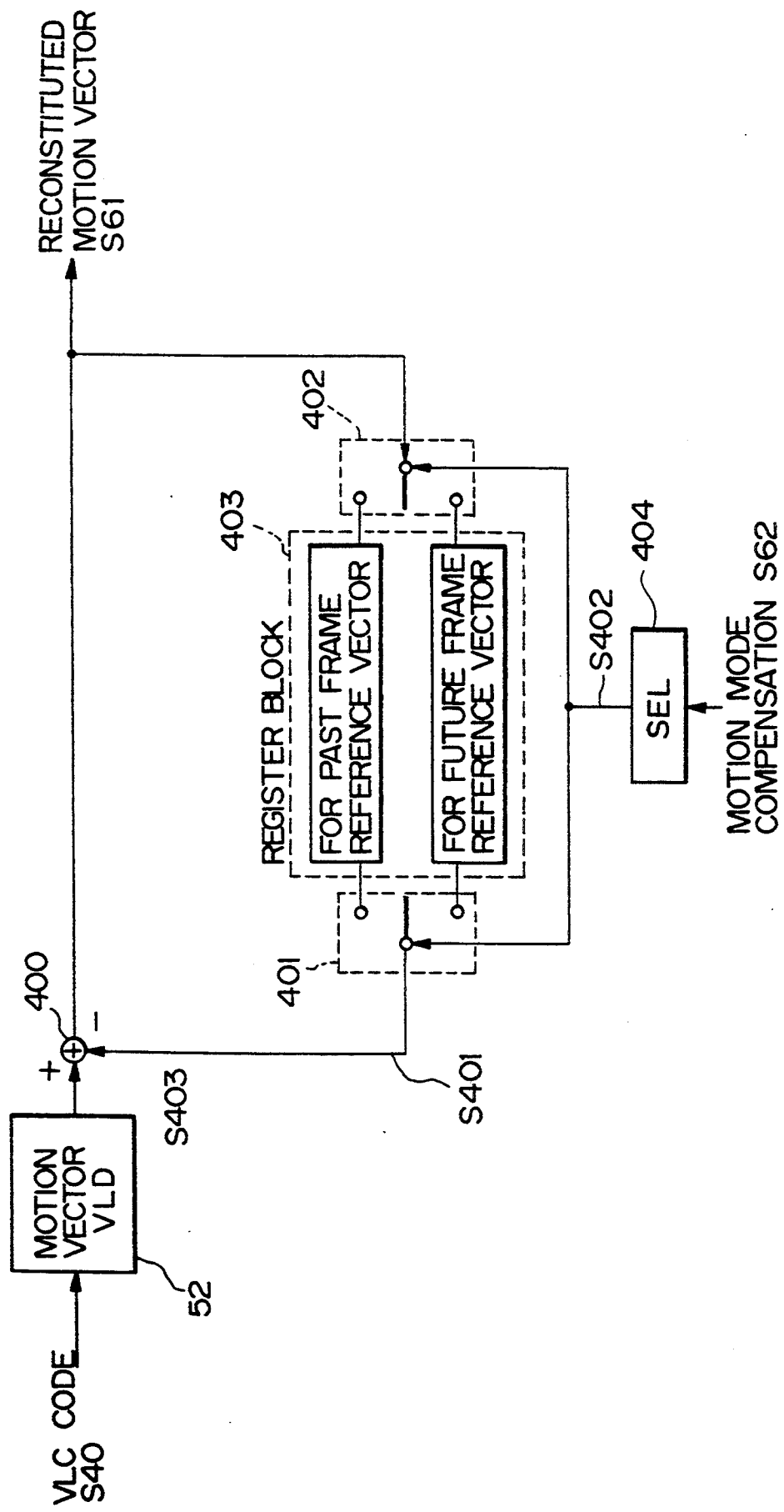
FIG. 10 is a block diagram of an inverse difference circuit for reconstituting motion vectors that have been difference coded in accordance with an embodiment of the invention.

The decoder apparatus in accordance with this embodiment performs an inverse difference operation on the difference vector which has been decoded by the motion vector VLD, reconstitutes the input motion vector on the basis of the data decoded by the motion vector VLD, and supplies the result to the motion compensator. FIG. 10 is a block diagram of the inverse difference circuit included in the decoder.

In the circuit of FIG. 10, the motion compensation mode signal S62 described above is supplied to a selector 404. Selector 404 outputs a register switching signal S402 to switches 401 and 402 associated with a register block 403. The register switching signal S402 controls the operation of the switches 401 and 402.

A motion vector S401 (with X2 representing the horizontal value and Y2 representing the vertical value) is read out from the register block 403 and supplied through the switch 401 to an adder 400.

The adder 400 is also supplied with a difference motion vector S403 (X1-X2, Y1-Y2) which is output from motion vector VLD 52. The adder 400 adds the motion vector S401 (X2, Y2) and the difference motion vector S403 (X1-X2, Y1-Y2) and outputs a reconstituted motion vector S61 (X1, Y1). The reconstituted motion vector S61 is overwritten in one of two registers making up the register block 403, being supplied thereto by the switch 402 under the control of register switching signal S402.

In encoding motion vector values using DPCM, it is known to perform variable length coding using a technique known as a fold-back method. This technique permits variable length coding of a range of DPCM values in a similar manner to that described above for VLC of a motion vector, while reducing the size of the required reference table. For example, in the reference table shown as Table 5, two possible DPCM values are assigned to each variable length code value.

TABLE 5

(DPCM VLC Reference Table with "Fold-Back")

| MOTION VLC CODE | SMALL | LARGE |
| --- | --- | --- |
| 0000 0011 001 | −16 | 16 |
| 0000 0011 011 | −15 | 17 |
| 0000 0011 101 | −14 | 18 |
| 0000 0011 111 | −13 | 19 |
| 0000 0100 001 | −12 | 20 |
| 0000 0100 011 | −11 | 21 |
| 0000 0100 11 | −10 | 22 |
| 0000 0101 01 | −9 | 23 |
| 0000 0101 11 | −8 | 24 |
| 0000 0111 | −7 | 25 |
| 0000 1001 | −6 | 26 |
| 0000 1011 | −5 | 27 |
| 0000 111 | −4 | 28 |
| 0001 1 | −3 | 29 |
| 0011 | −2 | 30 |
| 011 | −1 | 31 |
| 1 | 0 | |
| 010 | 1 | −31 |
| 0010 | 2 | −30 |
| 0001 0 | 3 | −29 |
| 0000 110 | 4 | −28 |
| 0000 1010 | 5 | −27 |
| 0000 1000 | 6 | −26 |
| 0000 0110 | 7 | −25 |
| 0000 0101 10 | 8 | −24 |
| 0000 0101 00 | 9 | −23 |
| 0000 0100 10 | 10 | −22 |
| 0000 0100 010 | 11 | −21 |
| 0000 0100 000 | 12 | −20 |
| 0000 0011 110 | 13 | −19 |
| 0000 0011 100 | 14 | −18 |
| 0000 0011 010 | 15 | −17 |
| 0000 0011 000 | N/A | N/A |

N/A—These table entries are not used and should not be generated by an encoder.

Table 5 is based upon a variable length coding reference table for a motion vector having a degree of accuracy of one picture element and a range of −16 to +15 picture elements. It will be noted that each variable length code value in the Table 5 has a "small" and "large" vector value assigned thereto. There are fixed relationships between the respective small and large values assigned to each variable length code value. In particular, where the "small" value is positive, the "large" value is equal to the small value less 32. On the other hand, where the "small" value is negative, the "large" value is equal to the small value plus 32. Since the range for the motion vector that can be encoded using Table 5 is −16 to +15 picture elements, the resulting range of DPCM values is ±31 picture elements. For example, and referring to Table 5, when the vector value for a preceding block is −16 and the vector value of a present block is 1, the DPCM value is 1−(−16)=17, and the variable length code value is "0000 0011 011".

Upon decoding this variable length code value at the decoder in order to obtain a motion vector value, the DPCM values corresponding to the variable length code value "0000 0011 011" are −15 and +17. However, since the motion vector value for the preceding block as determined at the decoder is −16, the value of the present motion vector must be either (−16+−15=−31) or (−16+17=1). Since the range for the motion vector values is limited to values between −16 and +15 picture elements, inclusive, the motion vector value must be 1, and not −31.

This is an illustration of the fold-back method referred to above. According to known approaches in this method, there must be provided a reference table that corresponds to the range of possible values of the motion vector. Thus, as noted before, if the range of possible motion vectors is increased, the storage capacity for the memory which stores the table also must be increased, which, in turn, increases the hardware scale.

In accordance with an embodiment of the invention, the need to increase the storage capacity of the memory is avoided by providing signals in the transmitted bit stream which represent the range of the motion vector (i.e., signals representative of forward_ f and backward_ f). A reference table like that shown in Table 5 is provided for variable length encoding the DPCM values where forward_ f=1 and backward_ f=1. Further, in a manner similar to that described in connection with the previous embodiments, the table shown in Table 5 may be extended, or the values thereof may be replaced, by performing appropriate calculations, resulting in a virtual table such as that shown in Table 6, which is appropriate for D=2 (forward_ or backward_=2).

TABLE 6

| | (D = 2) | | | |
| --- | --- | --- | --- | --- |
| | SMALL | | LARGE | |
| | b = 0 | b = 1 | | |
| MOTION VLC CODE | R = 0 | R = 1 | b = 1 | b = 0 |
| 0000 0011 001 b | −31 | −32 | 32 | 33 |
| 0000 0011 011 b | −29 | −30 | 34 | 35 |
| 0000 0011 101 b | −27 | −28 | 36 | 37 |
| 0000 0011 111 b | −25 | −26 | 38 | 39 |
| 0000 0100 001 b | −23 | −24 | 40 | 41 |
| 0000 0100 011 b | −21 | −22 | 42 | 43 |
| 0000 0100 11 b | −19 | −20 | 44 | 45 |
| 0000 0101 01 b | −17 | −18 | 46 | 47 |
| 0000 0101 11 b | −15 | −16 | 48 | 49 |
| 0000 0111 b | −13 | −14 | 50 | 51 |
| 0000 1001 b | −11 | −12 | 52 | 53 |
| 0000 1011 b | −9 | −10 | 54 | 55 |
| 0000 111 b | −7 | −8 | 56 | 57 |
| 0001 1 b | −5 | −6 | 58 | 59 |
| 0011 b | −3 | −4 | 60 | 61 |
| 011 b | −1 | −2 | 62 | 63 |
| 1 | 0 | | | |
| 010 b | 1 | 2 | −62 | −63 |
| 0010 b | 3 | 4 | −60 | −61 |
| 0001 0 b | 5 | 6 | −58 | −59 |
| 0000 110 b | 7 | 8 | −56 | −57 |
| 0000 1010 b | 9 | 10 | −54 | −55 |
| 0000 1000 b | 11 | 12 | −52 | −53 |
| 0000 0110 b | 13 | 14 | −50 | −51 |
| 0000 0101 10 b | 15 | 16 | −48 | −49 |
| 0000 0101 00 b | 17 | 18 | −46 | −47 |
| 0000 0100 10 b | 19 | 20 | −44 | −45 |
| 0000 0100 010 b | 21 | 22 | −42 | −43 |
| 0000 0100 000 b | 23 | 24 | −40 | −41 |
| 0000 0011 110 b | 25 | 26 | −38 | −39 |
| 0000 0011 100 b | 27 | 28 | −36 | −37 |
| 0000 0011 010 b | 29 | 30 | −34 | −35 |
| 0000 0011 000 b | 31 | N/A | N/A | −33 |

NOTE—For VLC code 1, no b extension bit follows.

Thus, unlike known techniques in which a plurality of reference tables are provided, according to the present invention only one reference table is stored in a ROM, rather than a plurality of tables, so that the necessary storage capacity of the ROM is minimized and the hardware scale is reduced. According to this embodiment, the calculation of the fold-back values is as follows:

When the "small" vector value is positive, the "large" value is equal to the "small" value less 32×D, and where the "small" vector value is negative, the "large" value is equal to the "small" value plus 32×D.

Table 7 is an illustration of a virtual reference table in which the reference table of Table 5 is extended for D=3 (forward_ f or backward_ f=3). The extension of Table 5 to form Table 6 or Table 7 is performed by a procedure similar to that illustrated in FIG. 11 and used to extend Table 1 to Table 2 or Table 3, and so need not be described in detail. Similarly, the decoding operation includes a procedure similar to that of FIG. 12, so that the decoding procedure again need not be described in detail.

TABLE 7

| | (D = 3) | | | | | |
|---|---|---|---|---|---|---|
| | SMALL | | | LARGE | | |
| | bb = 0 | bb = 10 | bb = 11 | | | |
| MOTION VLC CODE | R = 0 | R = 1 | R = 2 | bb = 11 | bb = 10 | bb = 0 |
| 0000 0011 001 bb | −46 | −47 | −48 | 48 | 49 | 50 |
| 0000 0011 011 bb | −43 | −44 | −45 | 51 | 52 | 53 |
| 0000 0011 101 bb | −40 | −41 | −42 | 54 | 55 | 56 |
| 0000 0011 111 bb | −37 | −38 | −39 | 57 | 58 | 59 |
| 0000 0100 001 bb | −34 | −35 | −36 | 60 | 61 | 62 |
| 0000 0100 011 bb | −31 | −32 | −33 | 63 | 64 | 65 |
| 0000 0100 11 bb | −28 | −29 | −30 | 66 | 67 | 68 |
| 0000 0101 01 bb | −25 | −26 | −27 | 69 | 70 | 71 |
| 0000 0101 11 bb | −22 | −23 | −24 | 72 | 73 | 74 |
| 0000 0111 bb | −19 | −20 | −21 | 75 | 76 | 77 |
| 0000 1001 bb | −16 | −17 | −18 | 78 | 79 | 80 |
| 0000 1011 bb | −13 | −14 | −15 | 81 | 82 | 83 |
| 0000 111 bb | −10 | −11 | −12 | 84 | 85 | 86 |
| 0001 1 bb | −7 | −8 | −9 | 87 | 88 | 89 |
| 0011 bb | −4 | −5 | −6 | 90 | 91 | 92 |
| 011 bb | −1 | −2 | −3 | 93 | 94 | 95 |
| 1 | 0 | | | | | |
| 010 bb | 1 | 2 | 3 | −93 | −94 | −95 |
| 0010 bb | 4 | 5 | 6 | −90 | −91 | −92 |
| 0001 0 bb | 7 | 8 | 9 | −87 | −88 | −89 |
| 0000 110 bb | 10 | 11 | 12 | −84 | −85 | −86 |
| 0000 1010 bb | 13 | 14 | 15 | −81 | −82 | −83 |
| 0000 1000 bb | 16 | 17 | 18 | −78 | −79 | −80 |
| 0000 0110 bb | 19 | 20 | 21 | −75 | −76 | −77 |
| 0000 0101 10 bb | 22 | 23 | 24 | −72 | −73 | −74 |
| 0000 0101 00 bb | 25 | 26 | 27 | −69 | −70 | −71 |
| 0000 0100 10 bb | 28 | 29 | 30 | −66 | −67 | −68 |
| 0000 0100 010 bb | 31 | 32 | 33 | −63 | −64 | −65 |
| 0000 0100 000 bb | 34 | 35 | 36 | −60 | −61 | −62 |
| 0000 0011 110 bb | 37 | 38 | 39 | −57 | −58 | −59 |
| 0000 0011 100 bb | 40 | 41 | 42 | −54 | −55 | −56 |
| 0000 0011 010 bb | 43 | 44 | 45 | −51 | −52 | −53 |
| 0000 0011 000 bb | 46 | 47 | N/A | N/A | −49 | −50 |

In accordance with the present invention, the encoding and decoding circuitry is required to store only one reference variable length coding table, even if a plurality of motion vector ranges and degrees of accuracy are to be used, so that the storage capacity of the ROM in which the table is stored can be minimized. Further, the single stored reference table can be extended so that the encoding and decoding circuitry can handle motion vectors for wider ranges than before. Moreover, by performing calculations that in effect replace values in the reference table, the encoding and decoding circuits can handle motion vectors which have narrower ranges than before. In this way the flexibility of the circuitry is increased and higher degrees of accuracy can be accommodated. Further, the coding efficiency for motion vectors can be increased by performing calculations to change the variable length coding table depending on the range and degree of accuracy with respect to which the motion vector is formed.

Having described specific preferred embodiments of the present invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of assigning a variable length code value to a motion vector, comprising the steps of:
   providing a reference table for associating with a respective variable length code value each possible value of motion vectors formed on the basis of a first picture element range and a first degree of accuracy;
   receiving a value of an input motion vector which represents motion between two frames of a moving picture signal;
   receiving information indicative of at least one of a picture element range and a degree of accuracy with respect to which said input motion vector was formed;
   accessing said reference table with said value of said input motion vector if said picture element range and said degree of accuracy with respect to which said input motion vector was formed are the same as said first picture element range and said first degree of accuracy;
   if at least one of said picture element range and said degree of accuracy with respect to which said input motion vector was formed is not the same, respectively, as said first picture element range and said first degree of accuracy, performing a calculation on said value of said input motion vector according to a predetermined formula to generate an access value and accessing said reference table with said access value; and forming an output bit stream which includes a variable length code value obtained by accessing said reference table with said value of said input motion vector or said access value, as the case may be.

2. A method according to claim 1; wherein if said picture element range with respect to which said input motion vector was formed is not the same as said first picture element range, an additional signal is included in said output bit stream together with said variable length code value obtained by accessing said reference table with said access value.

3. A method according to claim 2; wherein, if $|A| \geq a$ and $A > 0$, said access value is calculated as the sum of a and $[(A-a)/D]$ and said additional signal is established on the basis of the remainder obtained by dividing D into $(A-a)$; and if $|A| \geq a$ and $A < 0$, said access value is calculated by subtracting from zero the sum of a and $[(|A|-a)/D]$, and said additional signal is established on the basis of the remainder obtained by dividing D into $(|A|-a)$;

where a is a constant coefficient selected in relation to said reference table and is an integer $\geq 1$, A is said received value of said input motion vector, being a value in one of a horizontal direction and a vertical direction, D is an interval between said two frames of said moving picture signal, expressed in terms of a frame period, and $[r]$ is defined as the largest integer that is $\leq r$.

4. A method according to claim 2, wherein if said degree of accuracy with respect to which said input motion vector was formed is 0.5 picture element and is not the same as said first degree of accuracy:

if $|2 \times A| \geq a$ and $A > 0$, said access value is calculated as the sum of a and $[(2 \times A - a)/D]$ and said additional signal is established on the basis of the remainder obtained by dividing D into $(2 \times A - a)$; and if $|2 \times A| \geq a$ and $A < 0$, said access value is calculated by subtracting from zero the sum of a and $[(|2 \times A|-a)/D]$, and said additional signal is established on the basis of the remainder obtained by dividing D into $(|2 \times A|-a)$;

where a is a constant coefficient selected in relation to said reference table and is an integer $\geq 1$, A is said received value of said input motion vector, being a value in one of a horizontal direction and a vertical direction, D is an interval between said two frames of said moving picture signal, expressed in terms of a frame period, and $[r]$ is defined as the largest integer that is $\leq r$.

5. A method according to claim 2; wherein said additional signal is at least one additional bit.

6. A method according to claim 5; wherein said additional signal consists of two additional bits that are appended as LSB's to said variable length code value obtained by accessing said reference table with said access value.

7. A method according to claim 5; wherein said additional signal is "11" if said received value of said input motion vector is a multiple of three.

8. A method according to claim 5; wherein said reference table is formed using a fold-back method in which each variable length code value is associated with at least two motion vector values.

9. A method according to claim 5; wherein said first degree of accuracy is one picture element and said degree of accuracy with respect to which said input motion vector was formed is one of 0.5 picture element and one picture element.

10. A method according to claim 5; wherein said additional signal is an additional bit that is appended as a LSB to said variable length code value obtained by accessing said reference table with said access value.

11. A method according to claim 10; wherein said additional bit is "0" if said received value of said input motion vector is an odd number and said additional bit is "1" if said received value of said input motion vector is an even number.

12. A method according to claim 5 wherein said first picture element range is $\pm 16$ picture elements and said picture element range with respect to which said input motion vector was formed is one of $\pm 16$ picture elements, $\pm 32$ picture elements and $\pm 48$ picture elements.

13. A method according to claim 12; wherein said first degree of accuracy is one picture element and said degree of accuracy with respect to which said input motion vector was formed is one of 0.5 picture element and one picture element.

14. A method of decoding a motion vector value that has been variable-length encoded, comprising the steps of:

providing a reference table for associating respective variable length code values with motion vector values formed on the basis of a first picture element range and a first degree of accuracy;

receiving an input variable length code value representative of a value of an input motion vector;

receiving flag information indicative of an input picture element range and an input degree of accuracy with respect to which said input motion vector was formed, said input picture element range being a selected one of a plurality of picture element ranges including said first picture element range, said input degree of accuracy being a selected one of a plurality of degrees of accuracy including said first degree of accuracy, said input motion vector representing motion between two frames of a moving picture signal; and accessing said reference table on the basis of said received input variable length code and said received flag information.

15. A method according to claim 14; wherein, if said input picture element range is not the same as said first picture element range, said input variable length code value includes an additional bit code and said accessing step includes removing said additional bit code from said input variable length code value to form a truncated variable length code value and accessing said reference table with said truncated variable length code value to obtain a nominal motion vector value B.

16. A method according to claim 15; further comprising the steps of decoding said additional bit code to obtain a supplemental value R and calculating a decoded motion vector value from said nominal motion vector value B and said supplemental value R if said input picture element range is not the same as said first picture element range; said calculating step being performed such that:

if $|B| \geq a$ and $B>0$, said decoded motion vector value is calculated as the sum of a, R and $(D \times (B-a))$; and if $|B| \geq a$ and $B<0$, said decoded motion vector value is calculated by subtracting $(a+R)$ from $(D \times (B+a))$;

where a is a constant coefficient selected in relation to said reference table and is an integer $\geq 1$, and D is an interval between said two frames of said moving picture signal, expressed in terms of a frame period.

* * * * *